United States Patent [19]
Ishii et al.

[11] Patent Number: 5,564,518
[45] Date of Patent: Oct. 15, 1996

[54] FOUR-WHEEL DRIVE TRANSMISSION FOR WORKING VEHICLES

[75] Inventors: Norihiro Ishii, Itami; Takemi Kamada, Amagasaki; Hirohiko Kawada, Itami; Yoshinori Suetsugu, Toyonaka, all of Japan

[73] Assignee: Kanzaki Kokyukoki Mfg. Co., Ltd., Amagasaki, Japan

[21] Appl. No.: 230,902

[22] Filed: Apr. 21, 1994

[30] Foreign Application Priority Data

Nov. 25, 1993 [JP] Japan .................... 5-321276

[51] Int. Cl.⁶ .................... B60K 17/356; B60K 23/08; B60K 17/354
[52] U.S. Cl. .................... 180/242; 180/247; 74/473 R; 74/665 F; 192/3.63
[58] Field of Search .................... 180/247, 233, 180/243, 242; 74/473 R, 665 F, 665 G, 665 Q, 665 P; 192/3.63

[56] References Cited

U.S. PATENT DOCUMENTS

| | | | |
|---|---|---|---|
| 4,373,597 | 2/1983 | Itatani et al. | 180/70 |
| 4,421,335 | 12/1983 | Makishima et al. | 180/247 |
| 4,508,190 | 4/1985 | Uchiyama | 180/247 |
| 4,579,183 | 4/1986 | Irikura et al. | 180/53.1 |
| 4,592,442 | 6/1986 | Wilson et al. | 180/247 |
| 4,609,064 | 9/1986 | Suzuki et al. | 180/233 |
| 4,745,826 | 5/1988 | Nishikawa et al. | 180/247 X |
| 5,183,132 | 2/1993 | Fujisawa | 180/247 |
| 5,330,030 | 7/1994 | Eastman et al. | 180/247 X |

FOREIGN PATENT DOCUMENTS

| | | |
|---|---|---|
| 3-51260 | 9/1989 | Japan . |
| 3-73751 | 11/1989 | Japan . |

*Primary Examiner*—Eric D. Culbreth
*Assistant Examiner*—F. Zeender
*Attorney, Agent, or Firm*—Tilton, Fallon, Lungmus, Chestnut

[57] ABSTRACT

In a vehicle transmission comprising a hydrostatic transmission (13) and a rear-wheel drive assembly (20) including a two-stage speed change mechanism (28), a front-wheel drive assemly (22) having a front-wheel drive shaft (24) is disposed at a front side of the output shaft (17) and includes a clutch (55; 155; 255) such that when the change mechanism is shifted to its high-speed position the clutch is disengaged so as to provide a non-drive mode for front wheels. A selective drive mode is preferably provided by a one-way clutch (56) which is operable to connect the drive shaft to the output shaft only when forward directional rotation speed of the output shaft is larger than that of the drive shaft. In a preferred embodiment, the front-wheel drive assembly is shiftable at a low-speed position of the change mechanism between a constant drive mode and the selective drive mode. This drive assembly may also be fashioned such that it is shiftable at the low-speed condition between the constant or selective drive mode and non-drive mode.

15 Claims, 22 Drawing Sheets

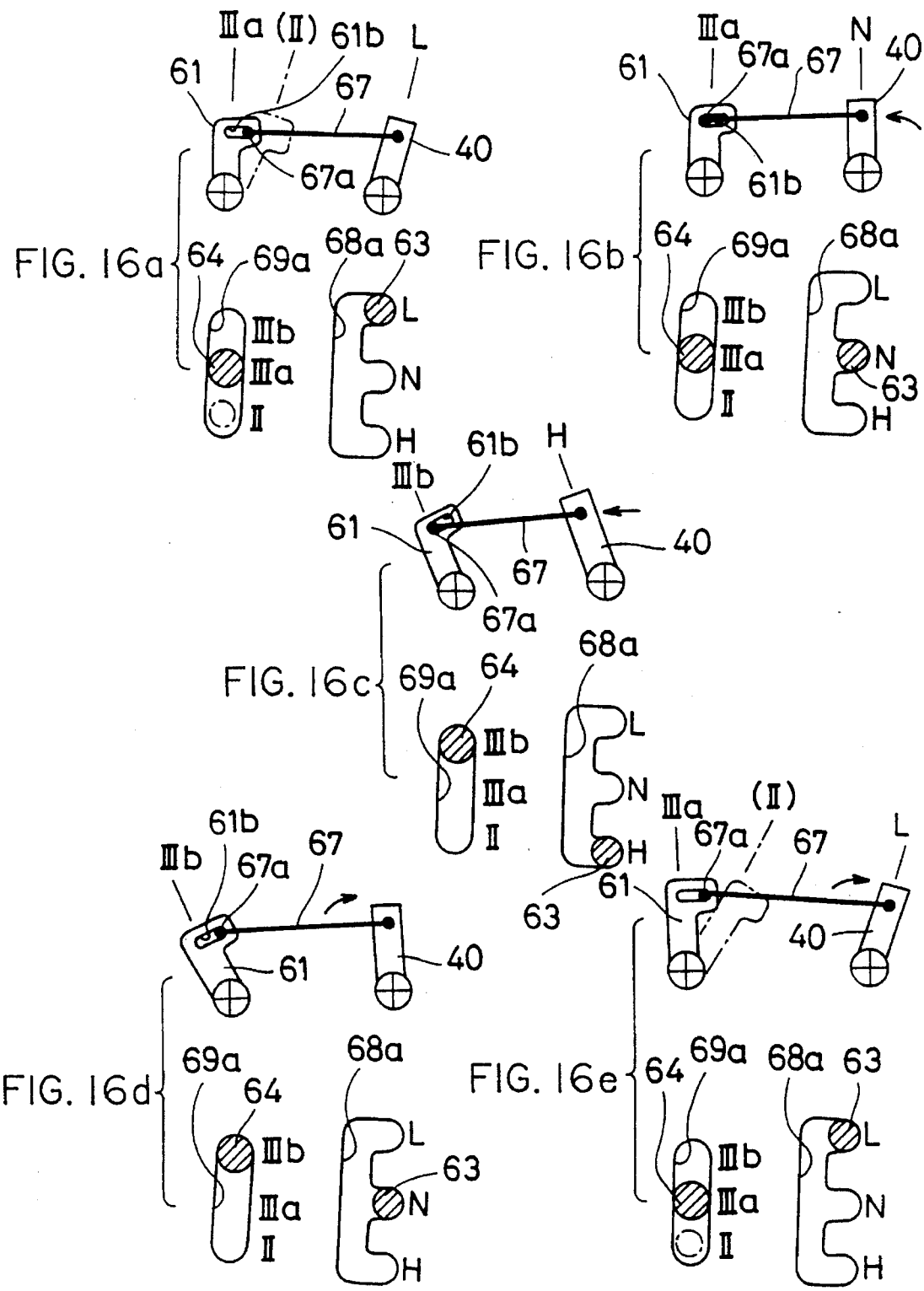

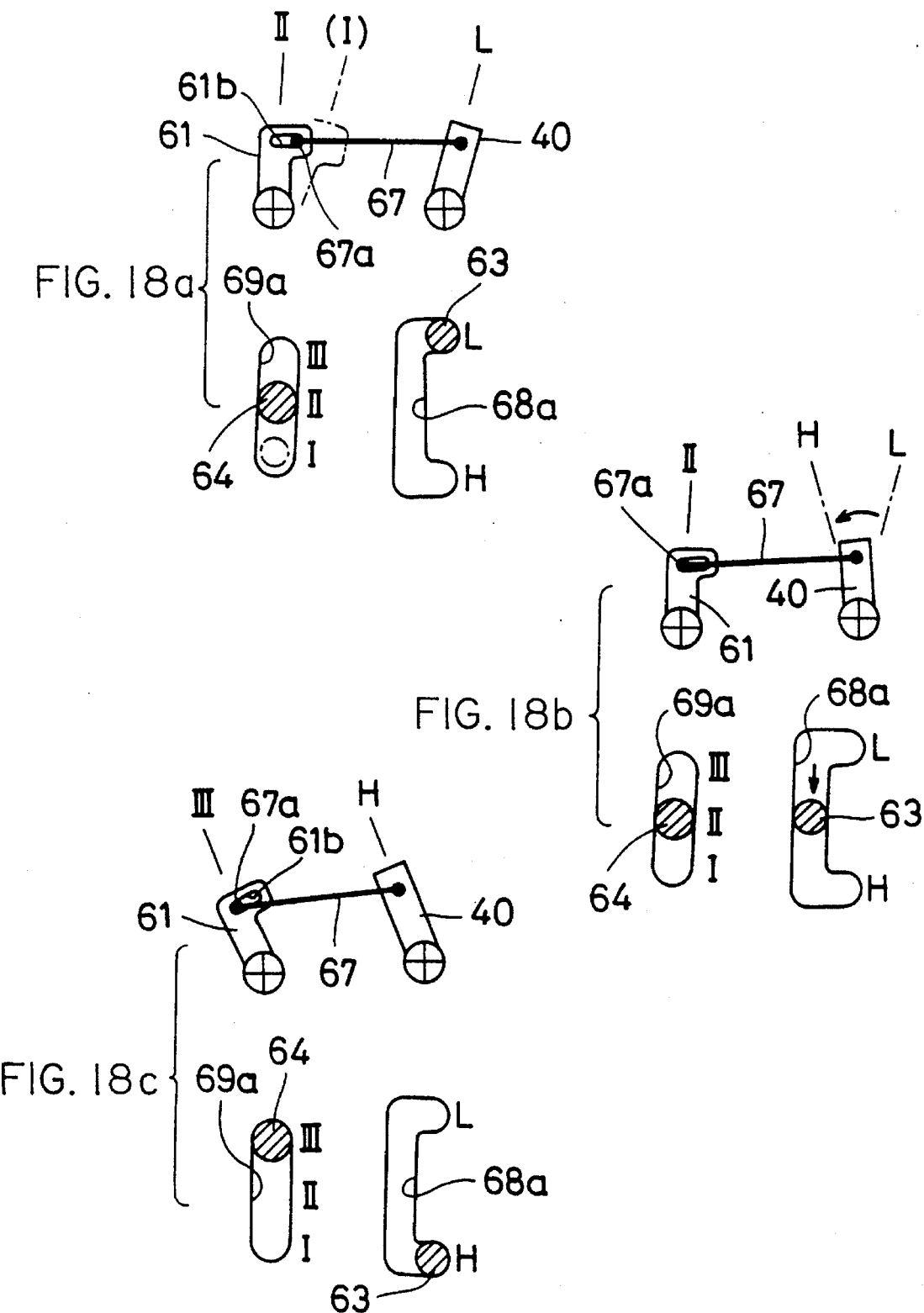

FOUR-WHEEL DRIVE TRANSMISSION FOR WORKING VEHICLES

FIELD OF THE INVENTION

This invention relates to a four-wheel drive transmission adapted for use in a working vehicle such as a tractor. More particularly, the present invention relates to a vehicle drive transmission which comprises a hydrostatic transmission for changing the traveling speed of the vehicle non-stepwisely, a rear-wheel drive assembly adapted to receive power from the rear end of the output shaft of the hydrostatic transmission and to drive left and right rear wheels constantly, and a front-wheel drive mechanism for driving left and right front wheels selectively.

BACKGROUND OF THE INVENTION

A four-wheel drive transmission of the type set forth above which is considered to be of the simplest structure in that, as disclosed in JP, U No. 3-73751, there is provided at a front side of the hydrostatic transmission a front-wheel drive assembly which comprises a front-wheel drive shaft for taking-off front-wheel driving power and a front-wheel drive clutch for selectively connecting the drive shaft to the front end of an output shaft of the hydrostatic transmission. However, this structure cannot be adopted when the rear-wheel drive assembly includes a speed change mechanism. This is because, while the peripheral speed of rear wheels is changed in response to a shifting operation of the speed change mechanism, the peripheral speed of front wheels driven to rotate through the front-wheel drive shaft remains unchanged, so that a condition may be caused where the peripheral speed between front wheels and rear wheels differs greatly.

Accordingly, in a transmission in which the rear-wheel drive assembly includes a speed change mechanism, a front-wheel drive shaft is provided which is connected to a transmission shaft of the driven side of the change mechanism through a clutch. Four-wheel drive transmissions each comprising such a front-wheel drive shaft are disclosed in U.S. Pat. No. 4,579,183; U.S. Pat. No. 4,373,597; and JP, U No. 3-51260.

Of these transmissions according to the prior art, the transmission disclosed in U.S. Pat. No. 4,579,183 comprises a hydrostatic transmission mounted on a front surface of a transmission casing, in which a rear-wheel drive mechanism is housed, and a front-wheel drive shaft which extends forwardly from the transmission casing at a level below that of the hydrostatic transmission. Although this structure has an advantage in that the front-wheel drive shaft can be provided without making any change or modification in a standard structure of the hydrostatic transmission, such front-wheel drive shaft is located at a low level so that it provides a restriction to the inclusion of a mid-mount auxiliary implement, such as a mid-mount mower, which is disposed at an underside of the vehicle.

In the transmission disclosed in U.S. Pat. No. 4,373,597, a front-wheel drive shaft extends forwardly from a transmission casing and through the housing of a hydrostatic transmission which is mounted on the front of the transmission casing. Accordingly, the front-wheel drive shaft is located at a high level. However, because this drive shaft must be arranged such that it does not interfere with the hydraulic pump and motor of the hydrostatic transmission, location of the drive shaft is deviated in the lateral direction of the vehicle to the left or right side so that arrangement of even a front-axle casing into which power is transmitted from the drive shaft through a transmission shaft must be changed. Further, the additional of structure to the housing of a hydrostatic transmission for passing the drive shaft therethrough is not preferred because such structure will make the hydrostatic transmission a design that is not a standard design and, therefore, will increase cost.

In the transmission disclosed in JP, U No. 3-51260, the output shaft or motor shaft of a hydrostatic transmission which is mounted on the front of a transmission casing is made hollow, and a front-wheel drive shaft is provided such that it extends forwardly from the transmission casing and through the hollow motor shaft. Although this structure also makes the level of the front-wheel drive shaft appropriate, such structure will make the hydrostatic transmission a design that is not a standard design and, therefore, will increase cost considerably. This is because the hollow motor shaft requires an enlargement of the outer diameter of this shaft so that the structure of hydraulic motor itself must be changed substantially.

Accordingly, a primary object of the present invention is to provide a four-wheel drive structure in a transmission comprising a rear-wheel drive assembly, which includes a two-stage speed change mechanism having high-speed and low-speed positions, disposed at a rear side of the output shaft of a hydrostatic transmission, by incorporating a front-wheel drive assembly at a front side of the output shaft of the hydrostatic transmission so as not only to make the level of a front-wheel drive shaft appropriate but to reduce cost.

In view of the fact that a working vehicle such as a tractor is used for various working operations and the fact that such vehicle is generally operated at a low speed when it is used for a working purpose and at a high speed when a particular tractive force is not required, e.g., when it is travelled on a road, another primary object of the invention is to provide a four-wheel drive structure, in a transmission including a two-stage speed change mechanism for rear wheels, which can provide plural drive modes for front wheels.

SUMMARY OF THE INVENTION

The present invention relates to a vehicle transmission comprising a hydrostatic transmission, which includes an output shaft extending axially of the vehicle, and a rear-wheel drive assembly which is disposed behind the output shaft of the hydrostatic transmission and is adapted to receive power from a rear end of the output shaft and to drive left and right rear wheels. The rear-wheel drive assembly includes a two-stage speed change mechanism having a high-speed position and a low-speed position.

For making such a transmission into a four-wheel drive structure, a front-wheel drive assembly is disposed according to the present invention before the output shaft of the hydrostatic transmission, and this drive assembly is fashioned such that it includes a front-wheel drive shaft extending axially of the vehicle for taking-off power for driving left and right front wheels and a clutch for selectively connecting the front-wheel drive shaft to a front end of the output shaft of the hydrostatic transmission. Clutch-operating means for shifting the clutch is particularly connected to shift means for shifting the speed change mechanism such that when the speed change mechanism is shifted to its high-speed position the clutch is shifted to a disengaged condition to disconnect the front-wheel drive shaft from the output shaft of hydrostatic transmission.

Consequently, when the speed change mechanism is placed in its high-speed position, the front-wheel drive shaft is disconnected from the output shaft of the hydrostatic transmission so that the front wheels are not driven to rotate. It is thus seen that front-wheel driving will not be problematic as long as the speed-reduction mechanism for the front wheels is fashioned such that when the speed change mechanism is placed in its low-speed position the front wheels are driven to rotate at a peripheral speed substantially equal to that of the rear wheels. It is when the vehicle is travelled on a road that the speed change mechanism is generally placed in its high-speed position to move the vehicle at a high speed. At such a time, the front wheels are not driven, resulting in a two-wheel drive by means of the rear wheels and a saving of fuel spent by a prime mover or engine. In view of the fact that a working vehicle is generally travelled at a low speed during working operation of the vehicle, diversification of drive modes for the front wheels can be achieved firstly by permitting the clutch to be shifted between its engaged condition and disengaged condition at the low-speed position of the speed change mechanism.

For diversifying front-wheel drive modes further, the present invention makes use of a one-way clutch. This one-way clutch is arranged such that it is engaged automatically to attain a driving condition of the front-wheel drive shaft by the output shaft of the hydrostatic transmission when the forward directional rotation speed of the output shaft is substantially larger than that of the drive shaft. By such arrangement of one-way clutch, it is possible to provide the front-wheel drive assembly with three modes: a constant drive mode in which the front-wheel drive shaft is constantly driven directly by the output shaft of the hydrostatic transmission through the clutch set forth before, a selective drive mode in which the drive shaft is driven by the output shaft through the one-way clutch only in a specific condition, and a non-drive mode in which driving of the front-wheel drive shaft is discontinued.

In the structure in which the front-wheel drive assembly has a selective drive mode provided by the one-way clutch as set forth above, when this drive mode is selected during a working condition where the vehicle is moving forward at a low speed by the two-wheel drive of the rear wheels, the one-way clutch is usually idling so as to remain in its disengaged condition though the front-wheel drive shaft is rotating forward-directionally due to the transmission of rotation from the front wheels which rotate passively with the forward travel of the vehicle. In a situation where the rear wheels are in a slipping condition, which may be caused when the rear wheels fall into a pit or while the vehicle is climbing up a slope or is turned, the forward directional rotation speed of the front-wheel drive shaft is lowered as compared to that of the output shaft of the hydrostatic transmission due to a reduction in traveling speed of the vehicle so that the one-way clutch is driven relatively from the side of the output shaft forward-directionally whereby this one-way clutch becomes engaged. By such engagement of the one-way clutch, the front-wheel drive shaft is forcedly driven by the output shaft of the hydrostatic transmission so that four-wheel drive condition is automatically attained. As a result of this, the slipping condition is eliminated quickly, attaining a stable traveling condition for the vehicle. For avoiding overly frequent engagements of the one-way clutch so as to prolong its life, the front-wheel drive assembly is preferably fashioned to further include a rotatable shaft which is driven to rotate by the output shaft of the hydrostatic transmission at a slightly reduced speed of rotation. And, the one-way clutch is preferably disposed such that it is engaged to connect between the rotatable shaft and front-wheel drive shaft when the forward directional rotation speed of the rotatable shaft is larger than that of the front-wheel drive shaft.

A light-load work operation such as mowing is generally carried out in the condition set forth above where the vehicle is travelled at a low speed by the two-wheel drive. The two-wheel drive contributes not only to the saving of fuel cost but to turning at a smaller turning radius which reduces damage to the ground while the vehicle is turned. Accordingly, a transmission employed in a vehicle which is generally used only for light-load working operations may well comprise a front-wheel drive assembly which has, as its positive drive mode, only a selective drive mode provided by a one-way clutch and which can be shifted between such a selective drive mode and a non-drive mode at the low-speed position of the speed change mechanism in the rear-wheel drive assembly. In a transmission employed in a vehicle which is used also for heavy-load working operations, a front-wheel drive assembly is preferably provided which can be shifted at the low-speed position of the change mechanism between a constant drive mode and either a selective drive mode or a non-drive mode. By this, a large tractive force required in a heavy-load working operation can be secured.

For an easy arrangement of the one-way clutch, the front-wheel drive assembly may preferably include a freely rotatable intermediate shaft disposed between the output shaft of the hydrostatic transmission and the front-wheel drive shaft so that the one-way clutch can be disposed between the output shaft and such intermediate shaft. When the front-wheel drive assembly is to be fashioned to have three modes in such a structure, the clutch described above is fashioned to provide a constant drive mode by connecting between the output shaft and front-wheel drive shaft, a selective drive mode by connecting between the intermediate shaft and front-wheel drive shaft, and a non-drive mode by disconnecting the front-wheel drive shaft from both of the drive shaft and intermediate shaft. When the front-wheel drive assembly is to be fashioned to have two modes, the clutch is fashioned to provide a selective drive mode by connecting between the intermediate shaft and the front-wheel drive shaft, and a non-drive mode by disconnecting the front-wheel drive shaft from the intermediate shaft. In each of these cases, the one-way clutch is operable at the selective drive mode to drive the front-wheel drive shaft selectively through the intermediate shaft.

In a vehicle transmission including a hydrostatic transmission, a fluid pressure-unloading valve which can be used for unloading high fluid pressure in the hydrostatic transmission is generally provided for those instances when the vehicle requires traction by another vehicle because of possible failure of engine-start due to a lowered capacity of the battery or the like. This is because, when the vehicle is drawn by another vehicle, the hydraulic motor of the hydrostatic transmission is driven reversely from the side of the drive wheels so that the motor acts as a hydraulic pump to generate a high fluid pressure which is confined in one of the connecting fluid passages between the pump and the motor of the hydrostatic transmission and resists against the traction of the vehicle. The unloading valve is fashioned, for example, such that it is operable to unload fluid pressure in one of the connecting passages referred to above to the other connecting passage so as to eliminate resistance against the vehicle traction. In the four-wheel drive transmission according to the present invention, the reverse driving of the hydraulic motor by the rear wheels can be avoided by providing the speed change mechanism in the rear-wheel drive assembly with a neutral position for interrupting transmission of power to the rear wheels. In this case, however, there remains a possibility of the reverse driving of the hydraulic motor by the front wheels. From this, in the transmission according to the present invention of the type in which the speed change mechanism has a neutral position, the clutch in the front-wheel drive assembly is connected to shift means for the change mechanism such that when the change mechanism is shifted in its neutral position the front-wheel drive assembly is placed to its non-drive mode. In the case where the front-wheel drive assembly has a selective drive mode, such drive assembly may satisfactorily be placed in its selective drive mode at the neutral position of the change mechanism. This is because when the vehicle is drawn by another vehicle, the front-wheel drive shaft is driven to rotate forward-directionally from the side of the front wheels so that the one-way clutch is kept in its disengaged condition and does not transmit the rotation of the front-wheel drive shaft to the output shaft of the hydrostatic transmission. By adopting the structure that the front-wheel drive assembly is placed at the neutral position of the change mechanism to either a non-drive mode or a selective drive mode as stated above, a fluid pressure-unloading valve as set forth above is not required.

The front-wheel drive assembly according to the present invention is arranged at a front side of the output shaft of the hydrostatic transmission and is adapted to receive power from a front end of the output shaft. Consequently, the front-wheel drive shaft of this assembly can be arranged at an appropriate level nearly equal to the level of the output shaft, and also the drive assembly can be provided without making any substantial change in a hydrostatic transmission of a standard design. Further, by providing the plural modes for the front-wheel drive assembly, a preferred mode can be selected in accordance with the condition of use of the vehicle.

BRIEF DESCRIPTION OF THE DRAWING

The present invention and its attendant advantages will become more readily apparent as the specification is considered in conjunction with the accompanying drawings in which:

FIGS. 16a to 16e are schematic views similar to FIGS. 10a to 10e, but illustrating the operation of the third embodiment;

FIGS. 18a to 18c are schematic views similar to FIGS. 10a to 10e, but illustrating the operation of the fourth embodiment;

DESCRIPTION OF PREFERRED EMBODIMENTS

Figure 1:
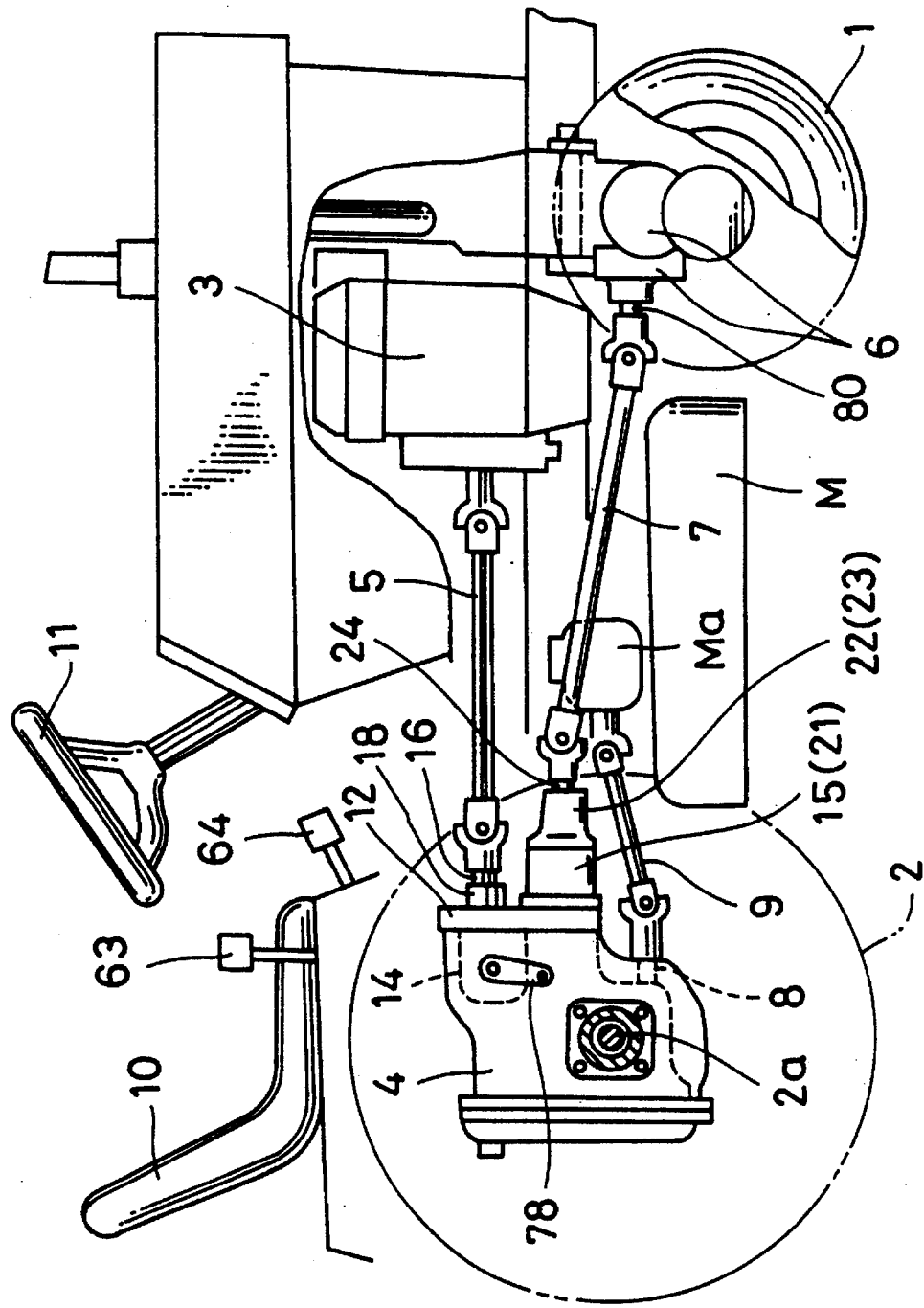
FIG. 1 is a schematic side view, partially cut away and partially in section, of a mower tractor in which a first embodiment of the four-wheel drive transmission according to the present invention is employed.

FIG. 1 shows a mower tractor in which a first preferred embodiment of the four-wheel drive transmission according to the present invention is employed. The tractor shown is adapted to be equipped with a mower M at an underside of the vehicle and between paired front wheels 1 and rear wheels 2.

As shown in FIG. 1, an engine 3 as a drive source is mounted on a front portion of the vehicle. Between the left and right rear wheels 2, a transmission casing 4 is disposed which supports wheel axles 2a of the left and right rear wheels 2. Power of engine 3 is transmitted into the transmission casing 4 through a transmission shaft 5 which extends axially of the vehicle. The vehicle is moved by driving the left and right rear wheel axles 2a at an inside of the transmission casing 4 so as to drive the rear wheels 2 and, as the occasion demands, by driving the left and right front wheels 1 through a transmission shaft 7 which is adapted to transmit power from a front side of the transmission casing 4 into a front-axle casing 6.

As also shown in FIG. 1, a mid-PTO shaft 8 extends forwardly at a low level from the transmission casing 4 and is adapted to transmit mower-driving power into a gear box Ma of the mower M through a transmission shaft 9. A seat 10 is disposed above the transmission casing 4, and a steering wheel 11 for providing steering turns to the left and right front wheels 1 is located before the seat 10.

Figure 2:
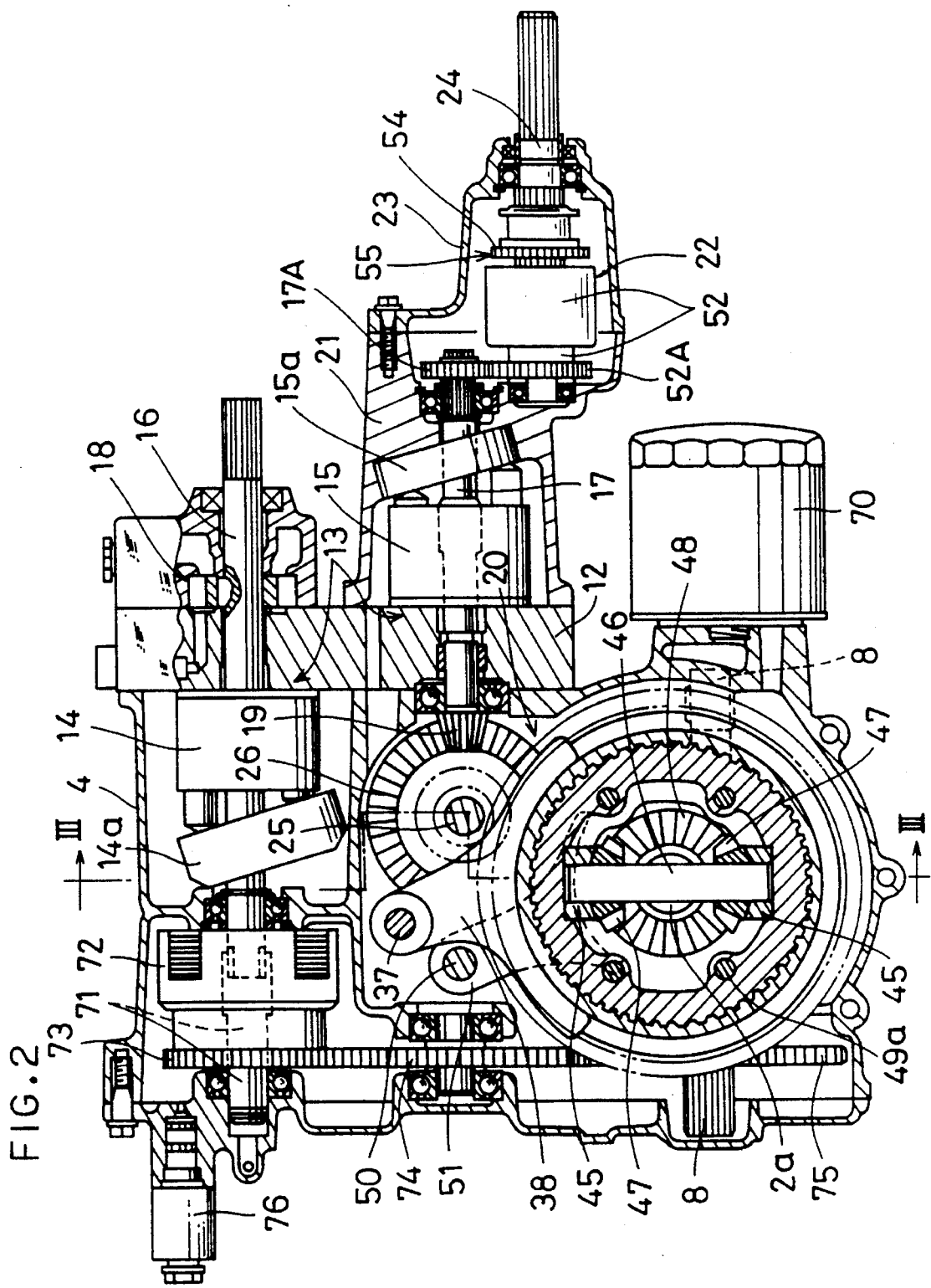
FIG. 2 is a sectional side view, partially developed, showing the transmission employed in the tractor shown in FIG. 1.

As shown in FIG. 2, a plate member 12 having a relatively large thickness is secured to a front of the transmission casing 4. A hydrostatic transmission 13 is provided and comprises a hydraulic pump 14 of a variable displacement type, which is mounted on a rear surface of an upper half of the plate member 12 and is located within the transmission casing 4, and a hydraulic motor 15 of a fixed displacement type which is mounted on a front surface of a lower half of the plate member 12 and is located outside the transmission casing 4. This hydrostatic transmission 13 has an input shaft 16, which is also employed as a pump shaft of the hydraulic pump 14, and an output shaft 17 which is also employed as a motor shaft of the hydraulic motor 15. A fluid pump 18 which is fashioned to a trochoid pump by employing input shaft 16 as its pump shaft is mounted on the front surface of the plate member 12. The input shaft 16 extends backwardly of the hydraulic pump 14 and is adapted to drive also the mid-PTO shaft 8, as will be detailed later.

As also shown in FIG. 2, the output shaft 17 of the hydrostatic transmission 13 extends backwardly through the plate member 12 into the transmission casing 4 and carries at its rear end a small bevel gear 19. Within the transmission casing 4, a rear-wheel drive assembly 20 is disposed below the hydraulic pump 14 and is adapted to receive power from the bevel gear 19 and to drive left and right rear wheel axles 2a to rotate. The output shaft 17 extends also forwardly from the hydraulic motor 15 and is adapted to transmit power to a front-wheel drive assembly 22 having a housing 23 which is connected integrally with a housing 21 of the hydraulic motor 15. The front-wheel drive assembly 22 comprises a front-wheel drive shaft 24 which extends forwardly from the housing 23 and is adapted to be coupled to the transmission shaft 7 shown in FIG. 1. Integral connection of the housings 21 and 23 will make lubricant oil common to the hydraulic pump 15 and to the front-wheel drive assembly 22.

Figure 3:
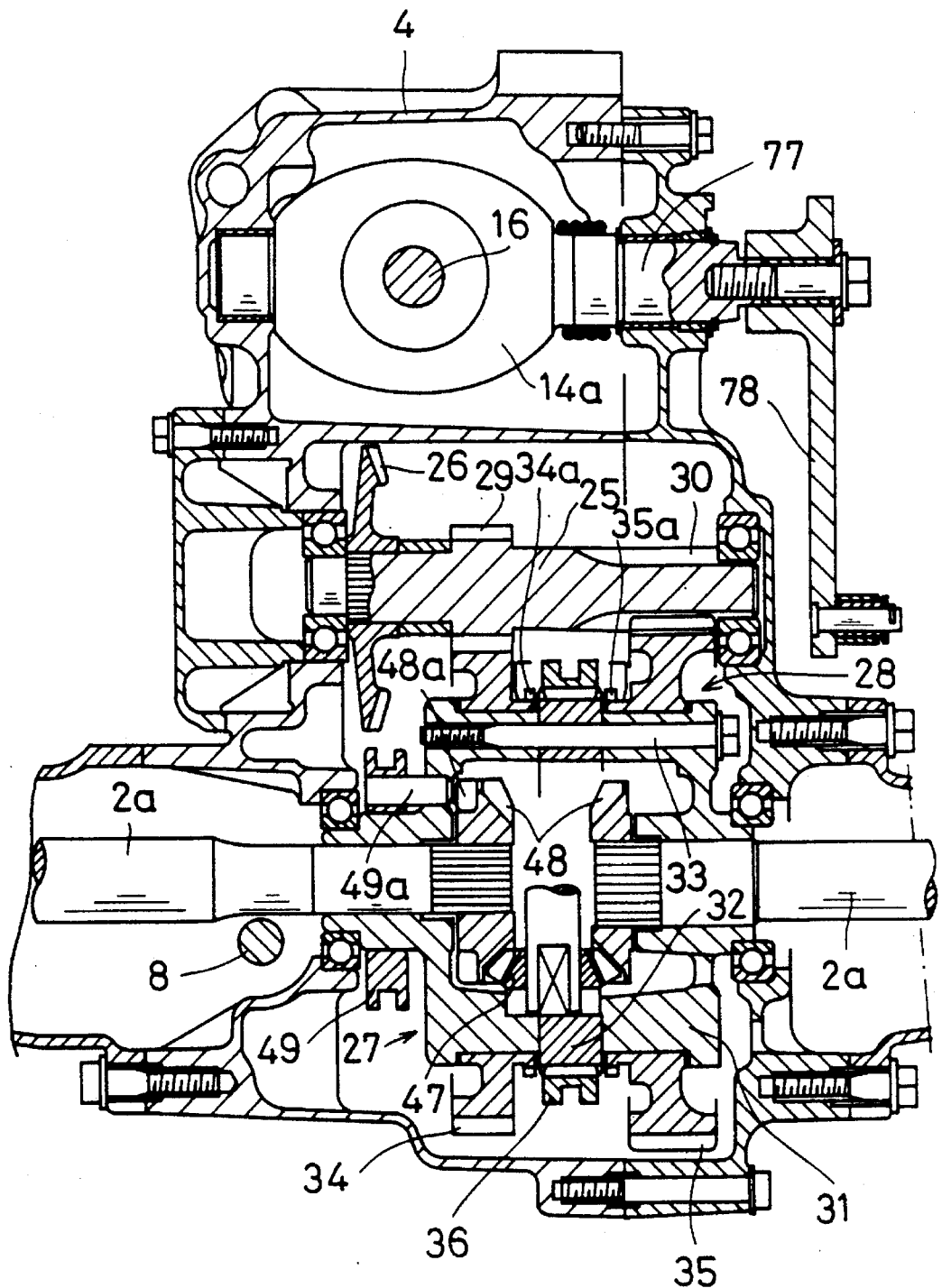
FIG. 3 is a sectional view taken generally along line III—III of FIG. 2.

As shown in FIGS. 2 and 3, the rear-wheel drive assembly 20 includes a drive shaft 25 which extends laterally of the transmission casing 4 within this casing at a level that is the same as that of the output shaft 17. A larger bevel gear 26 is fixedly mounted on the drive shaft 25 and meshes with the small bevel gear 19 on the output shaft. A differential gearing 27 is disposed between left and right rear wheel axles 2a, and a speed-change mechanism 28 which is operable to change the rotational speed of wheel axles 2a into two stages is disposed between the drive shaft 25 and differential gearing 27.

Figure 4:
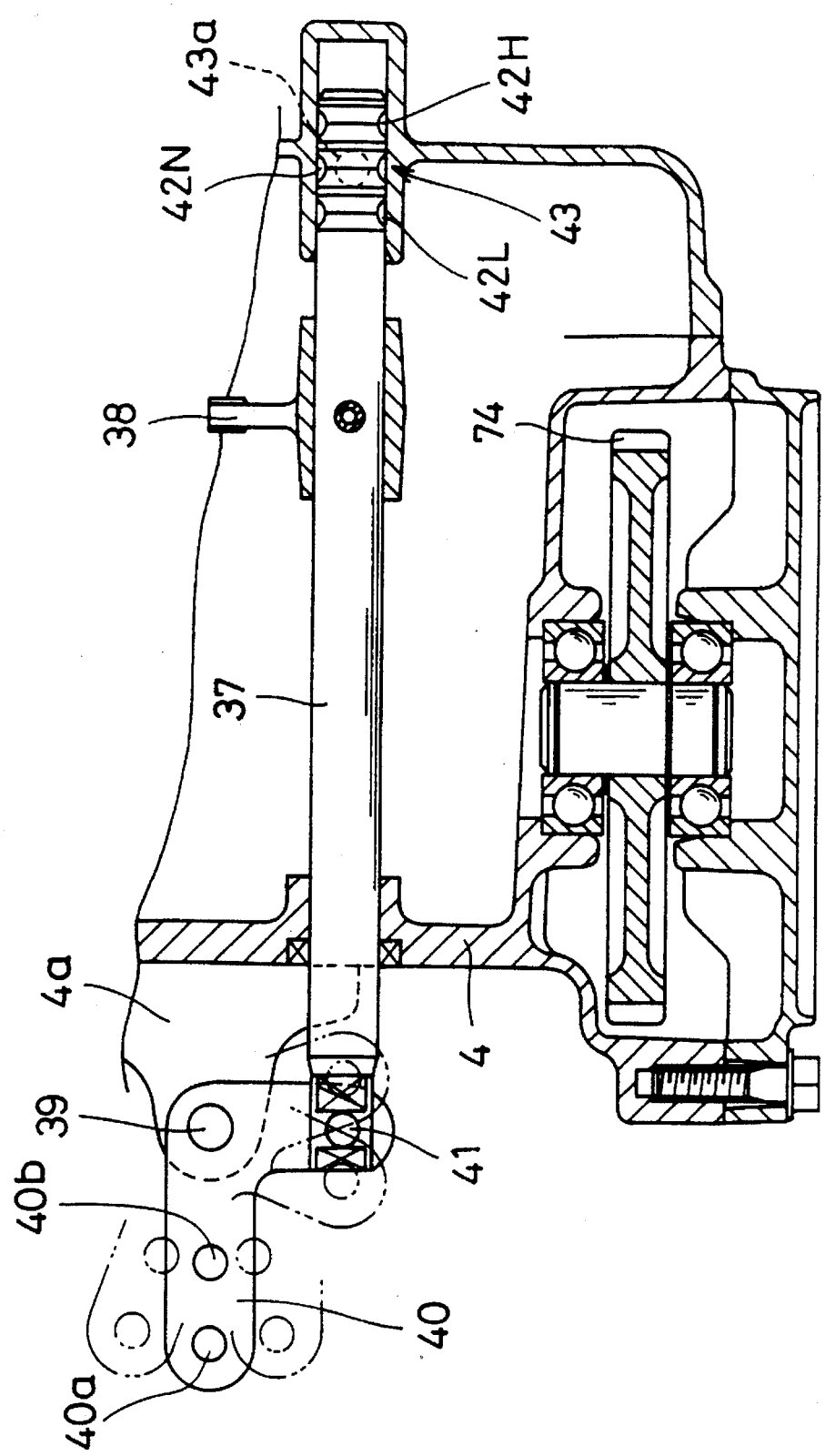
FIG. 4 is a cross-sectional view showing a part of a transmission casing shown in FIGS. 2 and 3.

The change mechanism 28 includes two gears 29 and 30 which are formed integral with the drive shaft 25. Differential casing 31 of the differential gearing 27 is composed of left and right casing halves which are fastened together with a ring member 32 therebetween using bolts 33, and the change mechanism 28 includes another two gears 34 and 35 which are rotatably mounted on the respective casing halves of the casing 31 and mesh with the gears 29 and 30 on the drive shaft 25. Boss portions of the gears 34 and 35 include, respectively, splines 34a and 35a. A shifter collar 36 which includes internal splines engageable with splines 34a and 35a are slidably but non-rotatably mounted on the ring member 32 by a spline fitting. The speed-change mechanism 28 is fashioned such that it is shifted to a high-speed position when the shifter collar 36 is slidingly displaced from its neutral position shown in FIG. 3 to an operative position where the collar engages with the splines 34a so as to couple the gear 34 to the differential casing 31, whereas the change mechanism is shifted to a low-speed position when the shifter collar 36 is slidingly displaced to another operative position where the collar engages with splines 35a so as to couple the gear 35 to the casing 31. For operating the shifter collar 36 to slide, a shifter fork 38 engaging at its lower end with the collar is provided and is fixedly supported, as shown in FIGS. 2 and 4, by a slidable shaft 37 which is supported by the transmission casing 4 and extends laterally of this casing at a location above and behind the change mechanism 28. As shown in FIG. 4, one end of the shaft 37 extends outwards of the transmission casing 4 and is connected using a vertical pin 41 to a bell crank-shaped change arm 40 which is rotatably supported by a bracket 4a on an outer surface of the transmission casing 4 through a vertical pin 39. In the outer circumference of the other end portion of shaft 37, there are formed three annular latching grooves 42N, 42H and 42L which correspond in position respectively to the neutral, high-speed and low-speed positions of the change mechanism 28. A latching or detent mechanism 43 is provided and includes a ball 43a which is projected selectively into each of the grooves 42N, 42H and 43L under biasing of a spring (not shown).

As shown in FIGS. 2 and 3 and as is conventional, the differential gearing 27 comprises a pair of pinion gears 47 (one of which is omitted in FIG. 3), mounted on a pinion shaft 46 which is non-rotatably supported by the differential casing 31 through a pair of bushings 45, and a pair of side gears 48 mounted fixedly on the left and right wheel axles 2a. These gears 47 and 48 are meshed with one another as shown. A differential lock clutch 49 is slidably mounted on a boss portion of one casing half of the differential casing 31 and has locking pins 49a, secured thereto, which extend through a side wall of the differential casing such that these pins 49a may be projected into recesses 48a in the boss of the differential side gear 48 of one side so as to lock the gear 48 non-rotatably to the differential casing 31. This differential lock clutch 49 is operated by a fork member 51, which is supported by a guide shaft 50 disposed adjacent to the shaft 37, and is operable to disable the differential gearing.

Figure 5:
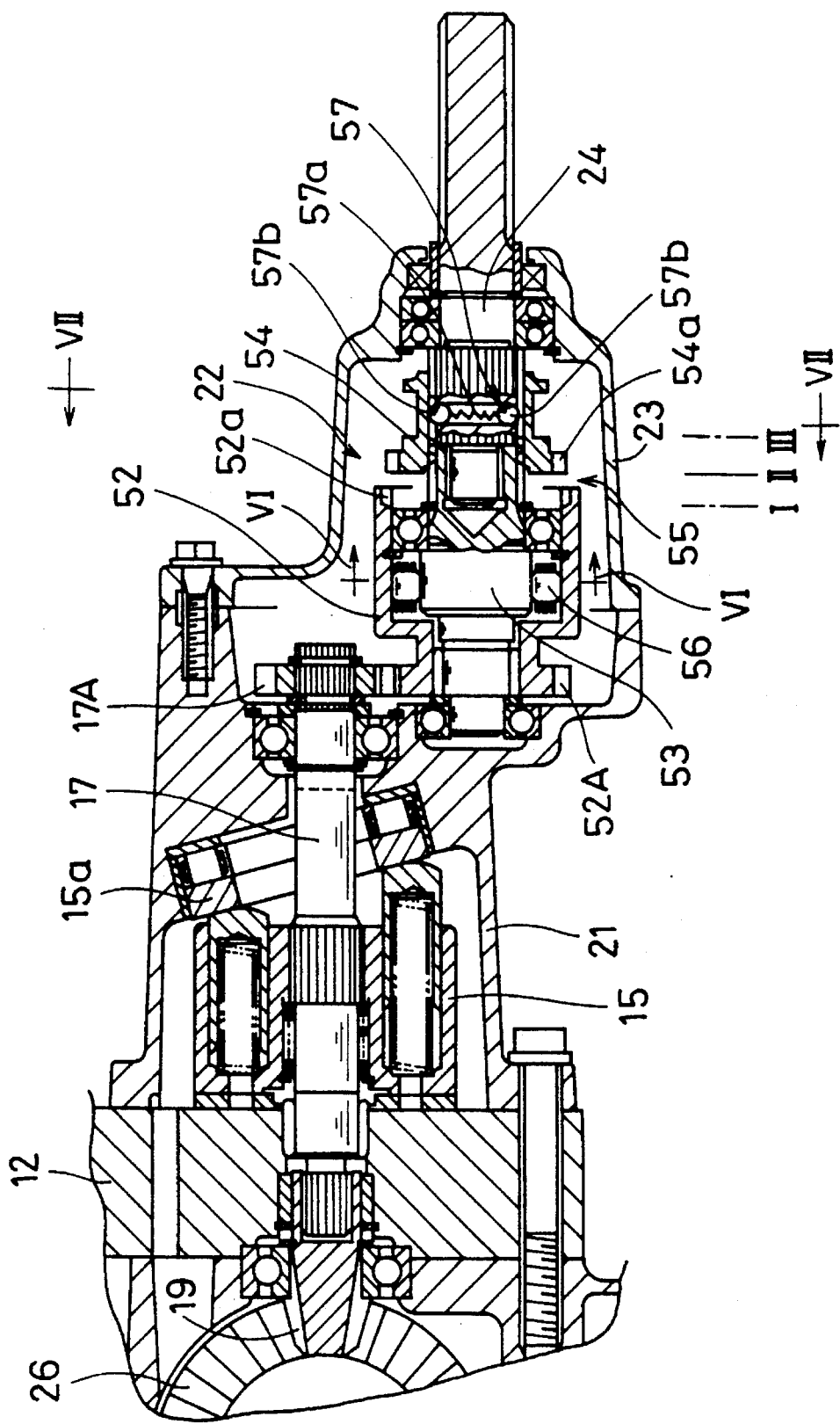
FIG. 5 is a sectional side view showing a hydraulic motor and front-wheel drive assembly shown in FIG. 2.

Referring now to the front-wheel drive assembly 22, a rotatably supported intermediate shaft 53 of a relatively small length is disposed, as clearly shown in FIG. 5, within the housing 23 co-axially with and behind the front-wheel drive shaft 24. A hollow shaft 52 is rotatably mounted on the intermediate shaft 53 and has at its rear end an integral gear 52A which is meshed with a gear 17A fixedly mounted on a front end portion of the output shaft 17 so that the hollow shaft 52 is driven to rotate by the output shaft 17 at a rotational speed substantially equal to that of the output shaft (at a slightly reduced speed as compared to that of output shaft 17). The hollow shaft 52 includes at its front end internal teeth 52a. A movable clutch sleeve 54, having teeth 54a engageable with the teeth 52a, is slidably mounted on the intermediate and front-wheel drive shafts 53 and 24 by a spline fitting. The clutch sleeve 54 is adapted to be displaced selectively to a first position where teeth 54a are engaged with the teeth 52a so as to couple the front-wheel drive shaft 24 to the hollow shaft 52, to a second position where the teeth 54a are disengaged from the teeth 52a but the sleeve 54 remains on both of the shafts 53 and 24 so that the front-wheel drive shaft 24 is coupled to the intermediate shaft 53, and to a third position where the sleeve 54 is located only on the shaft 24 so that the front-wheel drive shaft 24 is disconnected from both of the hollow shaft 52 and intermediate shaft 53. By this, a clutch 55 is provided which is shiftable to three conditions in accordance with the positions of the movable clutch sleeve 54.

Figure 6:
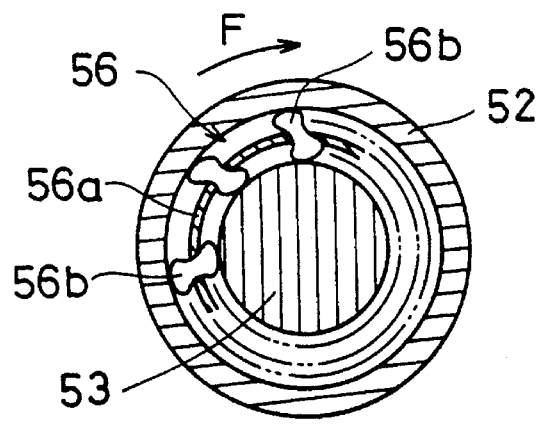
FIG. 6 is an enlarged sectional view taken along line VI—VI of FIG. 5.

As also shown in FIG. 5, a one-way clutch 56 is disposed between the hollow shaft 52 and the intermediate shaft 53. As shown in FIG. 6, this one-way clutch 56 comprises a plurality of engaging members 56b which are supported with the inclined postures shown by a retainer ring 56a disposed between the hollow and intermediate shafts 52 and 53 such that, when the forward directional rotation of hollow shaft 52 shown with arrow F is larger in speed than that of the intermediate shaft 53, the one-way clutch 56 is engaged automatically so as to transmit rotation from the hollow shaft 52 to the intermediate shaft 53.

Consequently, the clutch mechanism comprising the shiftable clutch 55 and the one-way clutch 56 provides, in accordance with the positions of clutch sleeve 54, three drive modes with respect to the front-wheel drive shaft 24. That is, when the front-wheel drive shaft 24 is coupled to the hollow shaft 52, a constant drive mode is provided in which the front-wheel drive shaft 24 is constantly driven to rotate by the output shaft 17. When the drive shaft 24 is coupled to the intermediate shaft 53, a selective drive mode is provided in which the front-wheel drive shaft 24 is driven to rotate by the output shaft 17 through the hollow shaft 52, the one-way clutch 56 and the intermediate shaft 53 only when the forward directional rotation of hollow shaft 52 is larger in speed than that of the intermediate shaft 53, namely that of the drive shaft 24, so that the one-way clutch 56 is in its engaged condition. When the drive shaft 24 is disconnected from both of the hollow and intermediate shafts 52 and 53, a non-drive mode is provided in which the front-wheel drive shaft 24 is no longer driven to rotate. In FIG. 5, positions of the clutch sleeve 54 in which the constant drive mode, selective drive mode and non-drive mode are provided are shown by characters I, II, and III as viewed at the rear end position of the clutch sleeve 54. A latching or detent mechanism 57 is disposed between the front-wheel drive shaft 24 and the clutch sleeve 54 and comprises a pair of balls 57b which can project into annular recesses in the inner surface of the clutch sleeve 54 under the biasing of a spring 57a so as to retain the sleeve 54 releasably at each of the positions I, II and III set forth above.

Figure 7:
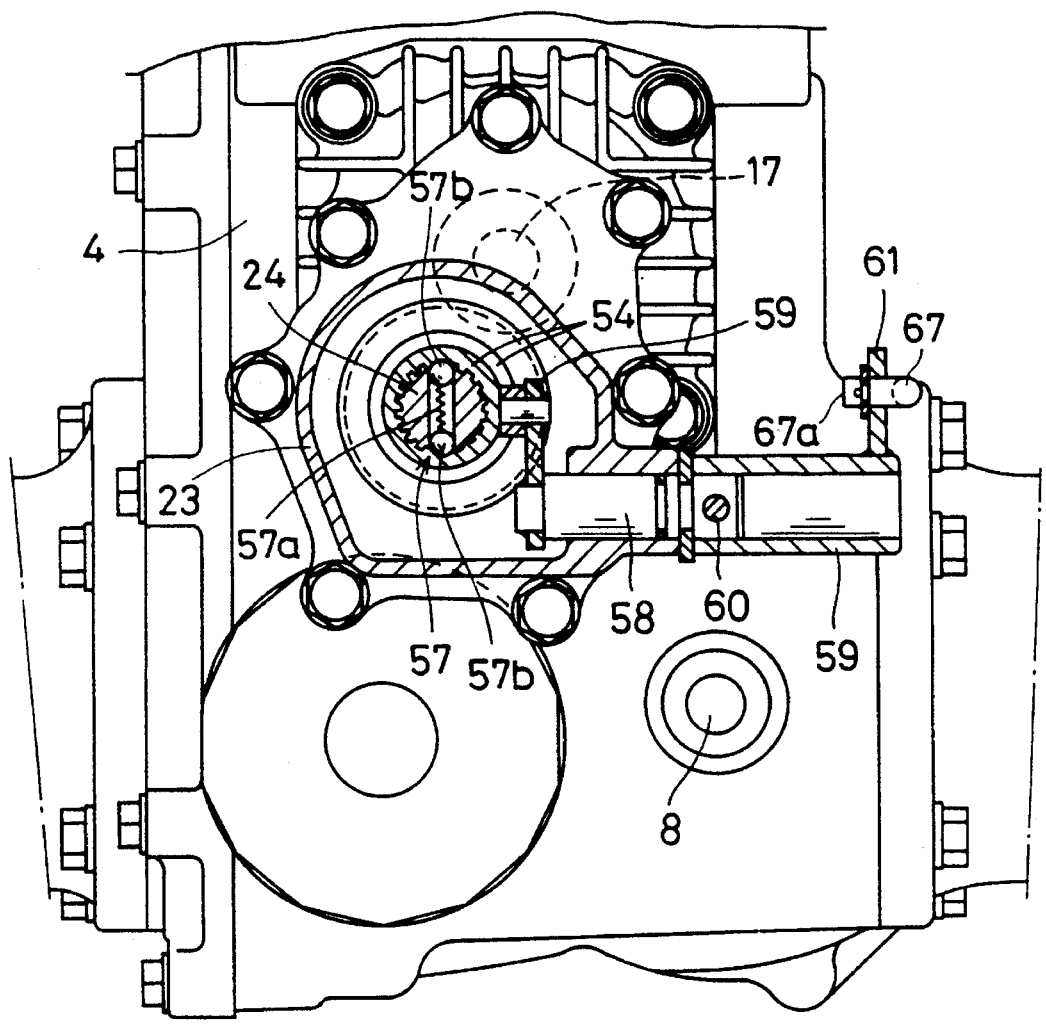
FIG. 7 is a sectional view taken along line VII—VII of FIG. 5.

As shown in FIG. 7, a rotatable control shaft 58 extends through a side wall of the housing 23 and carries at its inner end a shifter 59 which engages the movable clutch sleeve 54 so as to slidingly displace the sleeve when the control shaft 58 is operated to rotate. At an outside of the housing 23, a sleeve 59 having a clutch arm 61 secured thereto is fixedly mounted on the control shaft 58 using a pin 60.

Figure 8:
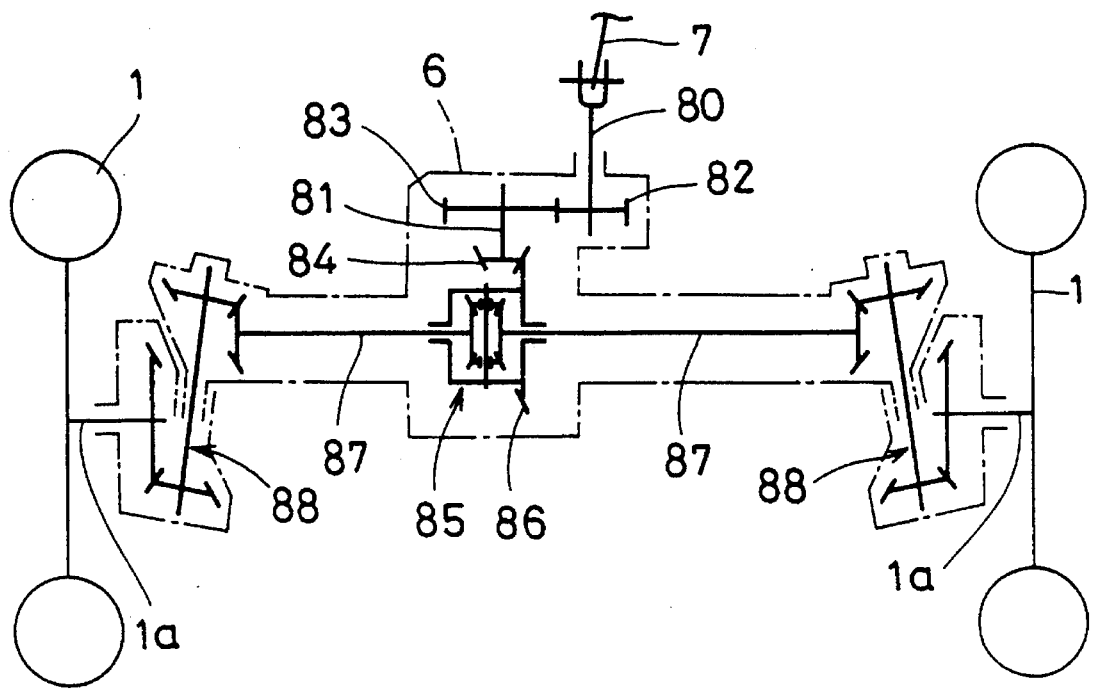
FIG. 8 is a schematic view showing a transmission mechanism in a front-axle casing shown in FIG. 1.

As shown in FIG. 1, the transmission shaft 7 which is connected at its rear end to the front-wheel drive shaft 24 is connected at its front end to an input shaft 80 of the front-axle casing 6. FIG. 8 illustrates the transmission mechanism from the input shaft 80 to the left and right front wheel axles 1a. As shown in FIG. 8, the input shaft 80 is connected at an inside of the axle casing 6 to a transmission shaft 81 through a speed-reduction gearing composed of meshing gears 82 and 83. The shaft 81 carries a bevel pinion 84 which meshes with a larger input bevel gear 86 of a front-wheel differential gearing 85. Left and right output shafts 87 of the differential gearing 85 are connected to the left and right front wheel axles 1a through left and right final speed-reduction mechanisms 88, each having two sets of paired bevel gears. The speed-reduction ratio between the input shaft 80 and each of the left and right front wheel axles 1a is predetermined such that, when the left and right front wheels 1 are driven to rotate through the front-wheel drive assembly 22 shown in FIG. 5, the peripheral speed of respective front wheels 1 is substantially equal to the peripheral speed of the respective rear wheels 2 when the speed change mechanism 28 shown in FIG. 3 is placed in its low-speed position.

As shown in FIG. 1, a change lever 63 and clutch lever 64 are disposed respectively at one side of the seat 10 for operating the speed change mechanism 28 shown in FIG. 3 and for operating the clutch 55 shown in FIG. 5. In the first embodiment, a connecting mechanism shown in FIG. 9 is provided for controlling the conditions of the clutch 55 in response to the shift positions of speed change mechanism 28.

Figure 9:
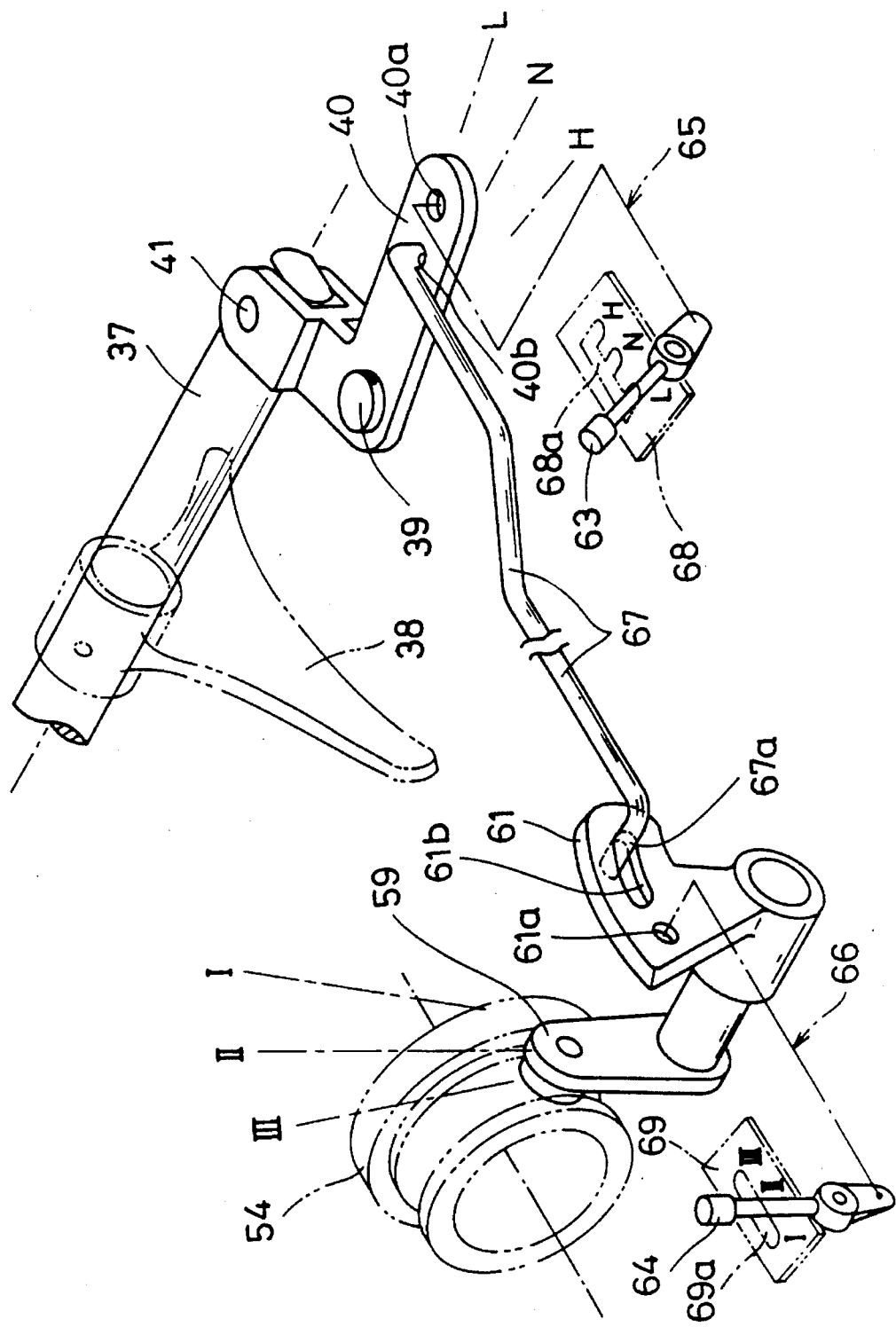
FIG. 9 is a schematic perspective view showing a shifting mechanism, a clutch-operating mechanism and a connecting mechanism therebetween which are employed in the first embodiment.

As schematically shown in FIG. 9, the change lever 63 is operatively connected to the change arm 40 through a connecting means such as a push-pull cable 65 which is connected at its end to the arm 40 using a perforation 40a in one end of this arm. Similarly, the clutch lever 64 is operatively connected to the clutch arm 61 through a connecting means such as a push-pull cable 66 which is connected at its end to the arm 61 using a perforation 61a in one end of this arm. The change arm 40 and the clutch arm 61 are further connected with each other by a curved connecting rod 67. This rod 67 has a bent end, which is fittingly received by a bore 40b in the change arm 40 so as to be displaced with a rotating displacement of the change arm 40, and another bent end 67a which is inserted into an arc-shaped elongated bore 61b in the clutch arm 61 so as to engage clutch arm 61 at one or the other end of the bore 61b. As also shown schematically in FIG. 9, change lever 63 is guided by a lever guide 68 having a guide groove 68a which includes lever-retaining recesses at low-speed, neutral and high-speed positions L, N and H corresponding to the low-speed, neutral and high-speed positions of the speed change mechanism 28 (FIG. 3). By such a change lever, the change arm 40 is operated so as to be rotationally displaced selectively to the low-speed, neutral and high-speed positions L, N and H shown. Clutch lever 64 is guided by a lever guide 69 having a straightened guide groove 69a and is operable to rotationally displace the clutch arm 61 selectively to constant drive mode position I, selective drive mode position II and non-drive mode position III which correspond respectively to the positions I, II and III of the clutch sleeve 54 shown in FIG. 5.

Figure 10:
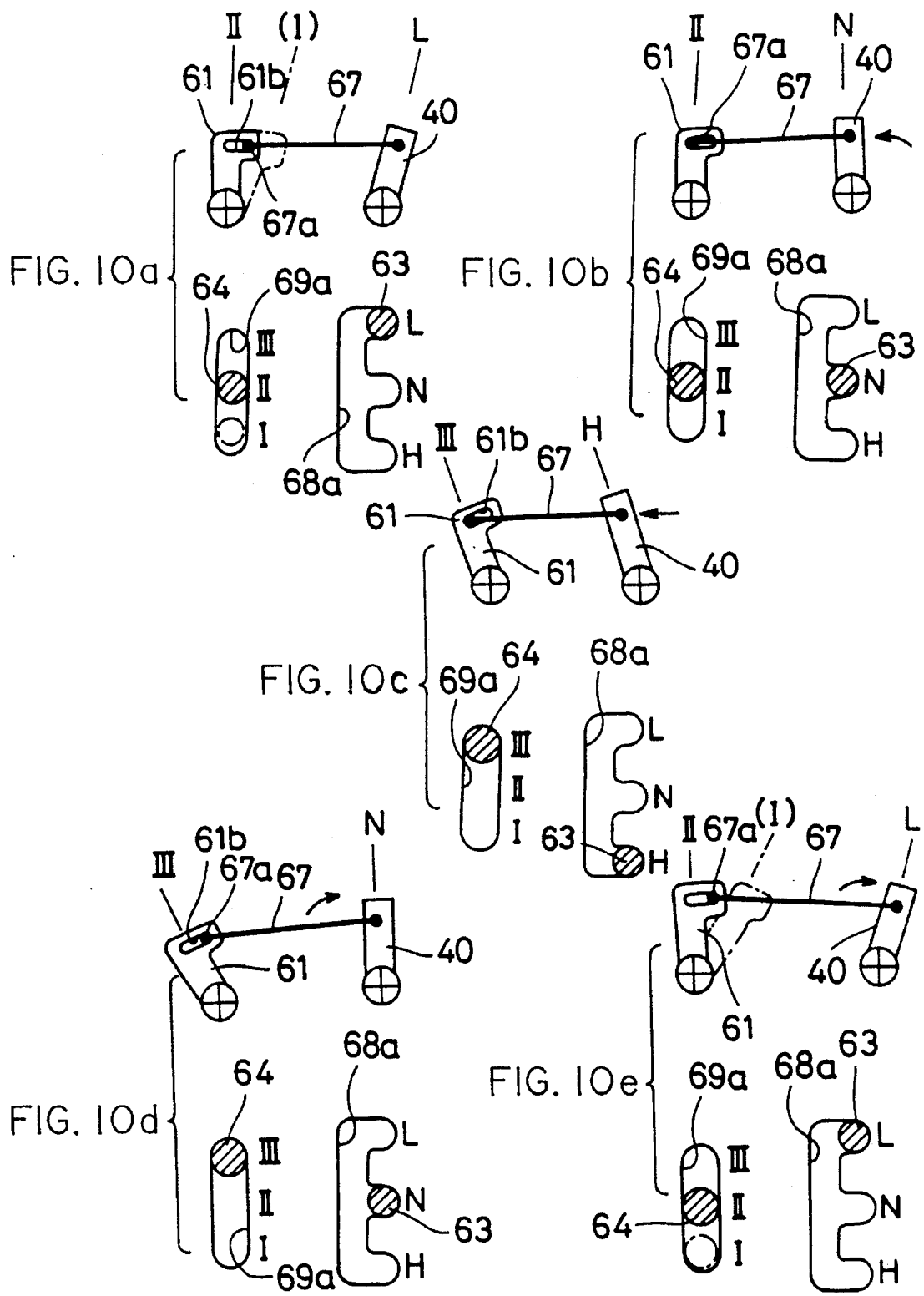
FIGS. 10a to 10e are schematic views for illustrating the operation of the mechanisms shown in FIG. 9.

The connecting mechanism shown in FIG. 9 will be detailed more fully by referring to FIGS. 9 and 10. The length of elongated bore 61b in the clutch arm 61 is predetermined to be equal to the amount of displacement of the connecting rod 67 at the time when the change arm 40 is displaced between two adjacent positions L and N or N and H by the change lever 63. Such length of the elongated bore 61b is also predetermined to be equal to the amount of displacement of the clutch arm 61 at the time when this arm 61 is displaced between two adjacent positions I and II or II and III. The bent end 67a of rod 67 is arranged relative to the elongated bore 61b in the clutch arm 61 such that the bent end 67a is located at one or the other end of elongated bore 61b at each of the positions L, N and H of the change lever 63 and change arm 40 and also at each of the positions I, II and III of the clutch lever 64 and clutch arm 61. As shown in FIG. 9 and in FIG. 10(a), it is predetermined that, in a condition where change arm 40 is displaced to its low-speed position L by the change lever 63, the bent end 67a is located at one end of the elongated bore 61b (the end nearest to the change arm 40) and that, in this condition, the clutch lever 64 and clutch arm 61 are located in their selective drive mode positions II.

Accordingly, when change lever 63 is operated from the condition shown in FIG. 9 and in FIG. 10(a) so as to get out of the lever-retaining recess of position L and to move to its neutral position N, the connecting rod 67 is displaced such that the bent end 67a thereof is displaced only within the elongated bore 61b from one end of this bore to the other end of the bore. Consequently, clutch arm 61 is kept unmoved and remains at its selective drive mode position II as shown in FIG. 10(b). When the change lever 63 and the change arm 40 are displaced from the positions shown in FIG. 10(b) to their high-speed positions H, the connecting rod 67 is displaced such that the bent end 67a thereof pushes the clutch arm 61 at the other end of elongated bore 61b to displace this arm 61 rotationally to its non-drive mode position III, as shown in FIG. 10(c). When the change lever 63 and the change arm 40 are displaced from the positions shown in FIG. 10(c) to their neutral positions N, the bent end 67a of the rod 67 is moved only within the elongated bore 61b so that clutch arm 61 remains at its non-drive mode position III, as shown in FIG. 10(d). When the change lever 63 and the change arm 40 are displaced from the positions shown in FIG. 10(d) to their low-speed position L, the bent end 67a of the rod 67 pushes the clutch arm 61 at one end of the elongated bore 61b to displace this arm 61 rotationally to its selective drive mode position II, as shown in FIG. 10(e) which illustrates a condition that is the same as that shown in FIG. 10(a). As can be seen from FIG. 10, it is fashioned that when clutch arm 61 is displaced rotationally by the change arm 40 through the connecting rod 67, the clutch lever 64 is also displaced rotationally through the connecting means of push-pull cable 66 shown in FIG. 9 to positions corresponding to those of the clutch arm 61.

How the position of the clutch arm 61 is changed in response to the operation of the change lever 63 is described above, and it will now be described how the clutch arm 61 can be operated by the clutch lever 64. Firstly, in the condition shown in FIGS. 10(a), (e) where the change lever 63 and the change arm 40 are placed in their low-speed position L, the bent end 67a of the connecting rod 67 is located at one end of the elongated bore 61b, the end which is at the side of constant drive mode position I of the clutch arm 61, so that, when clutch lever 64 is operated so as to displace the clutch lever 64 from its selective drive mode position II to its constant drive mode position I, clutch arm 61 is displaced rotationally from its selective drive mode position II to its constant drive mode position I while the bent end 67a of the rod 67 is displaced relative to the arm 61 within the elongated bore 61b from one end of this bore to the other end of the bore 61b without causing any displacement of the rod 67, as shown in phantom in FIGS. 10(a), (e). Also, when the clutch lever 64 is operated from the condition shown in phantom in FIGS. 10(a), (e) so as to displace it to its selective drive mode position II, the clutch arm 61 is displaced to its selective drive mode position II while the bent end 67a is displaced relative to the arm 61 within the elongated bore 61b towards the reverse direction without causing any displacement of the rod 67. It is thus seen that the clutch arm 61 can be displaced by the clutch lever 64 optionally between its constant drive mode position I and selective drive mode position II at the low-speed positions L of the change lever 63 and the change arm 40.

Secondly, in the condition shown in FIG. 10(c) where the change lever 63 and the change arm 40 are placed in their high-speed positions H, the clutch lever 64 cannot be operated from its non-drive mode position III towards its selective drive mode position II because the change lever 63 is placed in the lever-retaining recess of position H so as not to be displaced rotationally. Therefore, the displacement of clutch arm 61 towards its selective drive mode position II is prevented by the change lever 63 through the change arm 40 and connecting rod 67. That is, the clutch arm 61 is not only displaced to its non-drive mode position III by the operation of change lever 63 to its high-speed position H, as detailed before, but is necessarily kept in such a non-drive mode position III in the condition in which the change lever 63 is in its high-speed position H.

Thirdly, the condition where the change lever 63 and the change arm 40 are placed in their neutral positions N will be considered. In the neutral condition shown in FIG. 10(b), the clutch lever 64 may displace from its selective mode position II shown to its non-drive mode position III so as to displace the clutch arm 61 to its non-drive mode position III because the bent end 67a of the rod 67 is freely displaced relative to the arm 61 within the elongated bore 61b. However, displacement of the clutch lever 64 and the clutch arm 61 towards their constant drive mode positions I is precluded because the change lever 63 is prevented from a rotational displacement by the lever-retaining recess of position N. Accordingly, the change arm 40 and connecting rod 67 are also prevented from being displaced towards the reverse direction of the arrow shown in FIG. 10(b). Similarly, in the neutral condition shown in FIG. 10(d), the clutch lever 64 and the clutch arm 61 can be displaced from their non-drive mode positions III (shown) up to the their selective drive mode positions II but cannot be displaced further towards their constant drive mode positions I. That is, in the condition where the change lever 63 and the change arm 40 are placed in their neutral positions N, the clutch lever 64 and the clutch arm 61 are placed either in their selective drive mode position II or in their non-drive mode positions III and cannot be displaced to their constant drive mode positions I.

The relationship with regard to the lever and arm positions having been detailed above; it can now be summarized as the relationship between the speed change mechanism 28 and front-wheel drive assembly 22 as shown in the following TABLE 1.

TABLE 1

| Speed Change Mechanism 28 | Front-Wheel Drive Assembly 22 |
| --- | --- |
| Low-Speed Position L | Shiftable between Constant Drive Mode and Selective Drive Mode |
| Neutral Position N | Selective Drive Mode or Non-Drive Mode |
| High-Speed Position H | Non-Drive Mode (necessarily) |

The other parts of the vehicle transmission shown will be described in the following text. In FIGS. 2 and 3, numeral 14a designates a swash plate of the hydraulic pump 14, the inclination angle of which is varied or controlled by a control shaft 77 which extends through a side wall of the transmission casing 4 and has a control arm 78 attached thereto outside of the casing 4. As shown in FIGS. 2 and 5, the hydraulic motor 15 has a swash plate 15a of a fixed angle. In FIG. 2, numeral 70 designates an oil filter which is mounted on a lower portion of the front of the transmission casing 4 for purifying oil supplied from the inside of the casing 4, used also as an oil reservoir, to the fluid pump 18. Pump 18 is adapted to supply working oil to oil passages (not shown) connecting the hydraulic pump 14 and the motor 15. These oil passages and valves (also not shown) associated with the hydrostatic transmission 13 are incorporated in the plate member 12.

As shown in FIGS. 2 and 3, the mid-PTO shaft 8 is disposed in a lower portion within the transmission casing 4 and extends forwardly from a rear end portion of the casing 4 and below an underside of the rear wheel axle 2a and an underside of the plate member 12. As shown in FIG. 2, a transmission shaft 71 is disposed co-axially with and behind the input shaft 16 and is connected to the shaft 16 through a fluid-operated PTO-clutch 72 of a multi-disk type. A gear 73 is fixedly mounted on the transmission shaft 71 and is meshed through an intermediate gear 74 with a gear 75 which is fixedly mounted on the mid-PTO shaft 8. The fluid pump 18 is adapted to supply working oil also to the PTO-clutch 72. An electromagnetic control valve 76 is mounted on the rear of transmission casing 4 for controlling the supply of oil to the clutch 72.

When various operations are carried out using the tractor shown in FIG. 1, the speed change mechanism 28 shown in FIG. 3 is normally placed at its low-speed position. In such a low-speed condition, the constant drive mode or selective drive mode of the front-wheel drive assembly 22 shown in FIGS. 2 and 5 can be selected optionally, as shown in TABLE 1, using the clutch lever 64. Such selection of drive mode depends on the kind of work to be carried out.

When light-load work such as a mowing operation using the mower M is carried out, the selective drive mode is generally selected. While the vehicle is moved forward by the drive of left and right rear wheels 2 by means of the rear-wheel drive assembly 20 in this selective drive mode, the rotation given to the left and right front wheels 1 due to the forward directional travel of the vehicle is transmitted to the front-wheel drive shaft 24 through the transmission shaft 7 shown in FIG. 1 so that the drive shaft 24 is given a forward directional rotation by the front wheels 1. In this case, because the rotational speed of the front-wheel drive shaft 24 is usually equal to that of the output shaft 17, the one-way clutch 56 is kept in its disengaged condition. This scheme of vehicle drive in which only the rear wheels 2 are usually driven forcedly while the front wheels 1 are trailed contributes not only to the saving of fuel cost but to the turning of the vehicle at a smaller turning radius and reducing damage to the ground over which the vehicle turns. When the rear wheels 2 are in a slipping condition which may occur when the rear wheels fall into a pit or while the vehicle is climbing up a slope or is turned, the rotational speed of the front wheels 1 is reduced as compared to that of the rear wheels 2 because of a reduction in the traveling speed of the vehicle so that the rotational speed of the front-wheel drive shaft 24 is reduced. In this case, the one-way clutch 56 is driven relatively from the side of output shaft 17 so that this clutch 56 becomes engaged whereby the front-wheel drive shaft 24 is driven forcedly and a positive drive is given to the front wheels 1. Consequently, the slipping condition is eliminated quickly, and a stable traveling condition of the vehicle is attained. In the first embodiment, because the gear train of meshing gears 17A and 52A disposed between the output shaft 17 and the hollow shaft 52 is fashioned as a speed-reduction gear train which transmits the rotation of the output shaft 17 to the hollow shaft 52 at a slightly reduced speed of rotation, the one-way clutch 56 becomes engaged when the rotational speed of the front-wheel drive shaft 24 is reduced to a speed slightly lower than that of the output shaft 17. Consequently, the one-way clutch 56 is prevented from being engaged too frequently, prolonging the life of this clutch. When the vehicle is moved backwards, the one-way clutch 56 would be engaged if it were driven in a backward direction from the side of the front-wheel drive shaft 24 and the intermediate shaft 53. In this case, however, the output shaft 17 is rotating in a backward direction at a speed substantially equal to that of shafts 24 and 53 so that the one-way clutch 56 is usually kept disengaged. And, even if this clutch 56 should become engaged, it would become engaged without consequence.

In heavy-load work with a trailer, loader or the like associated with the tractor shown in FIG. 1, the front-wheel drive assembly 22 is generally placed in its constant drive mode so as to obtain the four-wheel drive of the vehicle and to thereby obtain a large tractive force. In addition, when this mode is adopted in backward travel of the vehicle, a stable traveling condition of vehicle is attained.

The speed change mechanism 28 shown in FIG. 3 usually placed in its high-speed position when no substantial tractive force is required, such as the case in which the vehicle is moved over a road. In this case, the front-wheel drive assembly 22 is automatically placed in its non-drive mode to save fuel.

When the vehicle requires traction thereof by another vehicle because of failure of the engine to start due to a lowered battery capacity or the like, the speed change mechanism 28 is operated to its neutral position. In this case, the front-wheel drive assembly 22 is placed automatically either in its non-drive mode or in its selective drive mode. When the vehicle is drawn by another vehicle, the one-way clutch 56 is kept in its disengaged condition not only in the non-drive mode but in the selective drive mode because, in the latter mode, this clutch 56 is driven in the forward direction from the side of front wheels 1. Consequently, the output shaft 17 is disconnected from the front wheels. Because the output shaft 17 is disconnected also from the rear wheels 2 by the speed change mechanism 28 of the neutral condition, a resistance against the traction is avoided. This resistance may be caused when the hydraulic pump 15 performs a pumping action as a result of being driven from the side of the vehicle wheels so that fluid pressure is confined in the closed circuit of the hydrostatic transmission 13.

Figure 11:
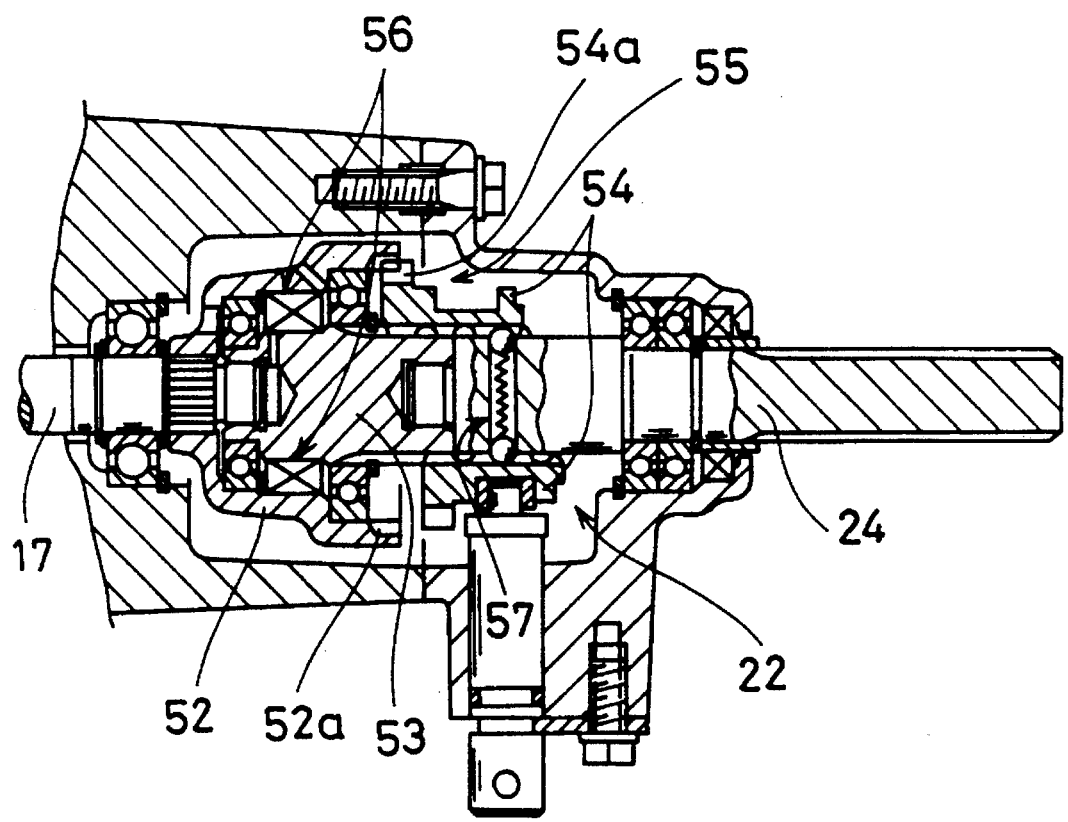
FIG. 11 is a sectional side view, partially developed, of a variation of the front-wheel drive assembly employed in the first embodiment.

FIG. 11 shows a variation of the front-wheel drive assembly employed in the first embodiment. In the front-wheel drive assembly 22 shown in FIG. 11, the intermediate shaft 53 and the front-wheel drive shaft 24 are disposed co-axially with the output shaft 17. Hollow shaft 52 is fixedly secured to a front end portion of the output shaft 17 and is disposed around the intermediate shaft 53. The structure of clutch 55 is the same as that of the one shown in FIG. 5, and the movable clutch sleeve 54 thereof is shown in FIG. 11 in its constant drive mode position with respect to an upper half of this sleeve and in the selective drive mode position with respect to a lower half of the sleeve. The clutch sleeve 54 is placed in its non-drive mode position when it is displaced forwardly (rightwards as viewed in FIG. 11) from the selective mode position. One-way clutch 56 and detent mechanism 57 are also provided similarly to the arrangement of FIG. 5.

Figure 12:
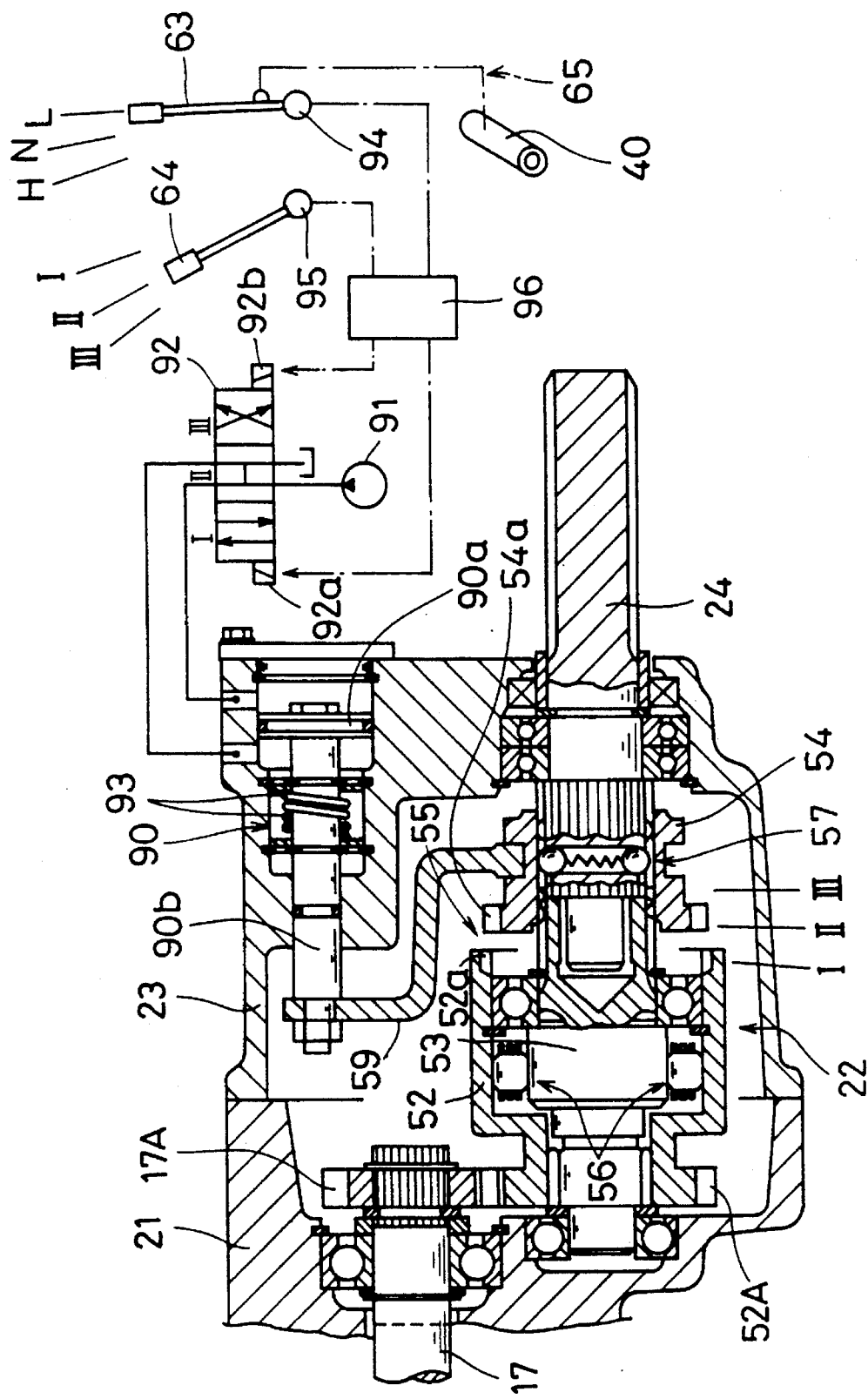
FIG. 12 is a sectional side view including a schematic view, showing a variation of the front-wheel drive assembly and operating mechanisms employed in the first embodiment.

FIG. 12 shows another variation in which a double-acting hydraulic cylinder 90 is provided for operating the clutch 55 of the clutch mechanism in the same manner as the one employed in the first embodiment and, in which operation of the hydraulic cylinder 90 is controlled by the change lever 63. As shown, the front-wheel drive assembly 22 or its clutch mechanism is substantially the same as the one employed in the first embodiment. The change lever 63 is operatively connected to a change arm 40, which is substantially the same as the aforedetailed one, through a connecting means such as a push-pull cable 65.

As shown in FIG. 12, the hydraulic cylinder 90 comprises a piston 90a, which is slidably fitted in a cylinder bore in a wall of the housing 23 of the front-wheel drive assembly 22, and a piton-rod 90b which is attached to a shifter 59 for operating the movable clutch sleeve 54 of the clutch 55. An electromagnetic control valve 92 is provided for controlling the supply of fluid from a fluid pump 91 to the hydraulic cylinder 90. This control valve 92 has a selective drive mode position II in which fluid is drained from both of the fluid chambers in the cylinder 90, a constant drive mode position I in which fluid is supplied to one of the fluid chambers so as to provide an extending operation to the cylinder 90 and to thereby displace the clutch sleeve 54 to its constant drive mode position I, and a non-drive position III in which fluid is supplied to the other fluid chamber in the cylinder so as to provide a contracting operation to the cylinder 90 and to thereby displace the clutch sleeve 54 to its non-drive mode position III. In the selective drive mode position I of the control valve 92, the piston 90a is placed in the position shown by the action of a spring 93 disposed on the piston-rod 90b so that the clutch sleeve 54 is located in its selective drive mode position II.

Accordingly, in the variation shown in FIG. 12, the hydraulic cylinder 90 constitutes a clutch-operating member which corresponds to the clutch arm 61 employed in the first embodiment. The electromagnetic control valve 92 for controlling the operation of cylinder 90 is connected to the change lever 63 and to the clutch lever 64 in a fashion which will be detailed below. There are provided sensors 94 and 95, e.g. sensor switches or potentiometers, which detect the operated positions of the change lever 63 and the clutch lever 64, respectively. Further, there is provided a controller 96 which receives electric signals from the sensors 94 and 95 and is operable to change the position of the control valve 92. The controller 96 is connected to the solenoids 92a and 92b of the electromagnetic control valve 92 such that the solenoids are energized and disenergized selectively so that the position of the control valve 92 is controlled in a manner which is the same as that detailed before with respect to the clutch arm 61.

Consequently, the variation shown in FIG. 12 operates in a manner which is the same as that of the first embodiment and provides the same three modes listed in TABLE 1. According to the variation shown in FIG. 12, "Selective Drive Mode or Non-Drive Mode" in TABLE 1 can be replaced by "Non-Drive Mode" (or "Selective Drive Mode") with ease.

In the first embodiment and its variations that have been detailed hereinbefore, the front-wheel drive assembly 22 is fashioned such that it is shifted to three modes. Such drive assembly may also be fashioned such that it is shifted to two modes, namely a constant drive mode and non-drive mode or a selective drive mode and non-drive mode.

Figure 13:
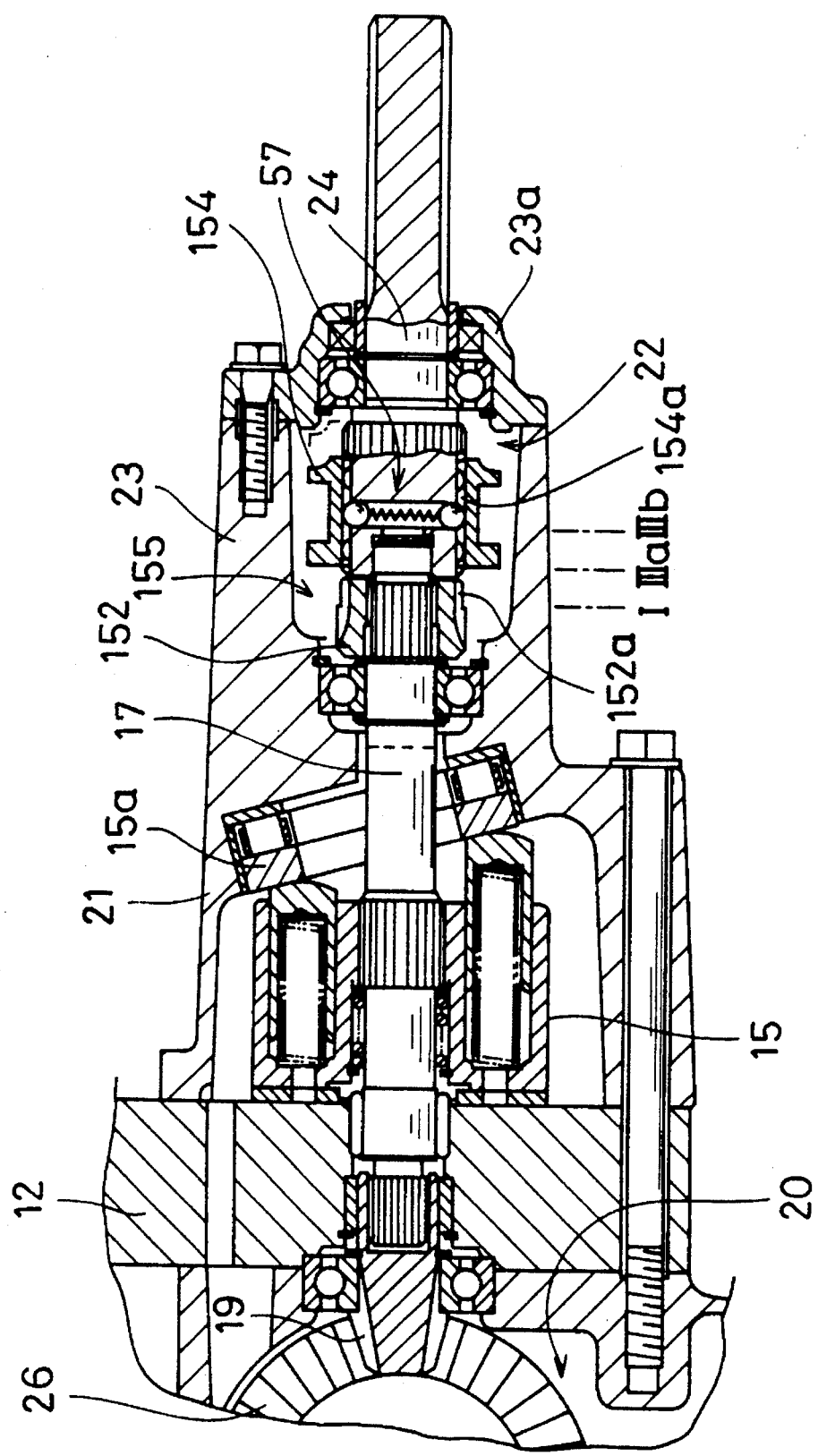
FIG. 13 is a sectional side view similar to FIG. 5, but showing a second embodiment.
Figure 14:
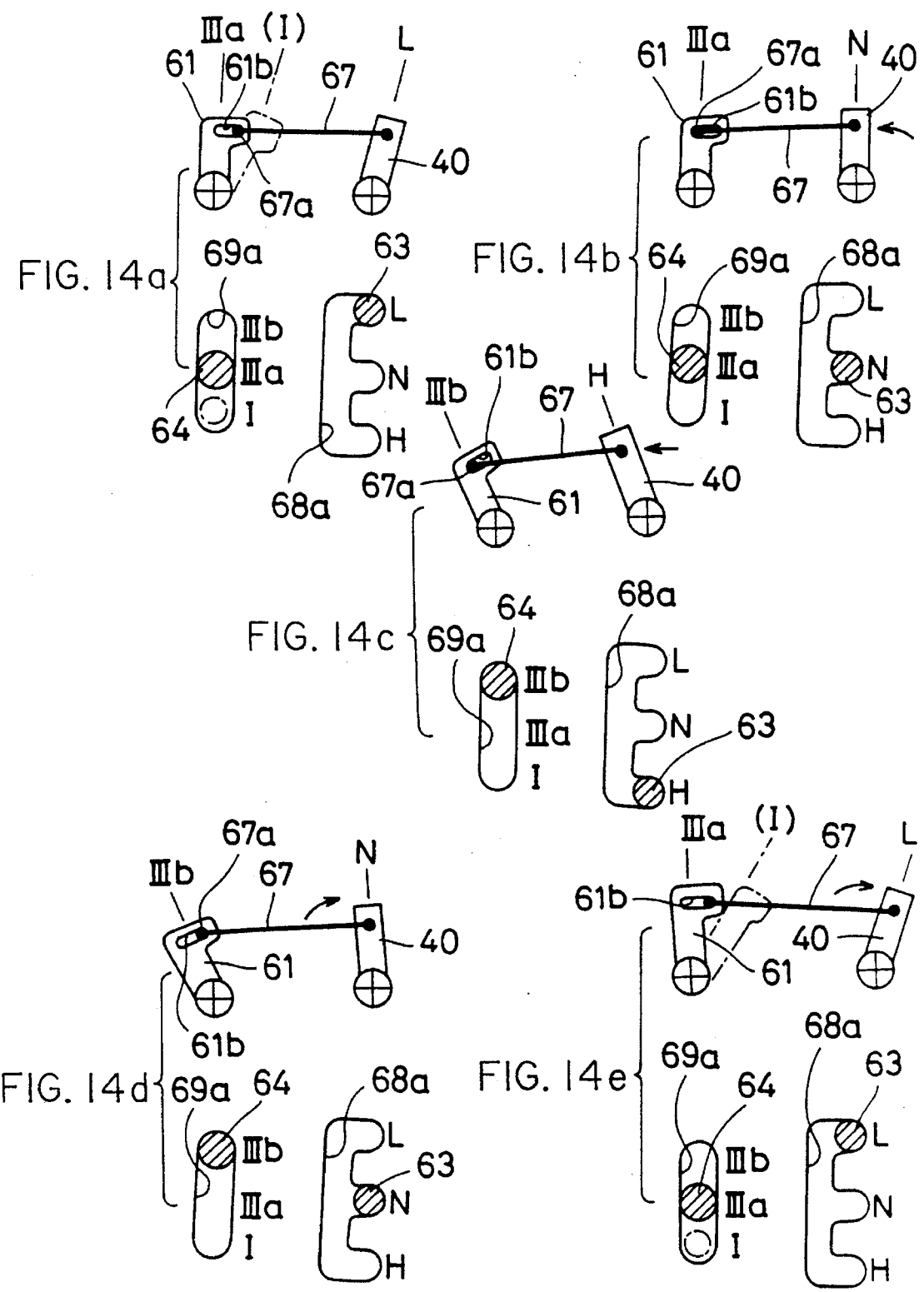
FIGS. 14a to 14e are schematic views similar to FIGS. 10a to 10e, but illustrating the operation of the second embodiment.

FIGS. 13 and 14 show a second embodiment comprising a front-wheel drive assembly 22 which is fashioned to have a constant drive mode and a non-drive mode. The rear-wheel drive assembly 20 (only a part of which is shown in FIG. 13) includes a speed change mechanism (not shown) which has a high-speed position, neutral position and low-speed position, as in the case of the speed change mechanism 28 employed in the first embodiment.

As shown in FIG. 13, a front-wheel drive shaft 24 is disposed co-axially with the output shaft 17 of the hydrostatic transmission and is supported rotatably by a housing 23 of the drive assembly 22 which is formed as a forward extension of the housing 21 for the hydraulic motor 15. This drive shaft 24 extends forwardly of a front cover 23a of the housing 23. In place of the aforedescribed hollow shaft 52, an annular member 152 having external splines 152a is fixedly mounted on a front end portion of the output shaft 17. A clutch sleeve 154 having internal splines 154a is slidably mounted on the front-wheel drive shaft 24 by a spline fitting whereby a clutch 155 is provided which is operable to connect between the output shaft 17 and drive shaft 24 by the meshing of the splines 154a with both of the splines 152a of the annular member 152 and the splines in the outer surface of the drive shaft 24. In correspondence with the three positions of speed change mechanism in the rear-wheel drive assembly 20, the clutch sleeve 154 is adapted to be placed in three positions. These positions are shown in FIG. 13 by characters I, IIIa and IIIb as viewed at the rear end position of the sleeve 154 and include first and second non-drive mode positions IIIa and IIIb in addition to a constant drive mode position I. A detent mechanism 57 similar to the aforedescribed one is provided for releasably retaining the clutch sleeve 154 at each of these positions I, IIIa and IIIb.

The clutch sleeve 154 is operated to slide by an operating mechanism which is the same as the one employed in the first embodiment. FIG. 14 illustrates such operating mechanism and its operation in a manner which is the same as that of FIG. 10. FIGS. 14(*a*) to (*e*) correspond to FIGS. 10(*a*) to (*e*) and illustrate displacements of the change lever 63, change arm 40, connecting rod 67, clutch arm 61 and clutch lever 64 in successive order. The aforedetailed descriptions of operation of the mechanism shown in FIG. 10 can be applied to the operation of the mechanism shown in FIG. 14, as they are, if the phrases "selective drive mode position II" and "non-drive mode position III" in the descriptions are replaced respectively by the phrases "first non-drive mode position IIIa" and "second non-drive mode position IIIb". Accordingly, the relationship with respect to the positions of the members 63, 40 and 64, 61 is represented as shown in the following TABLE 2.

TABLE 2

| Change Lever 63 and Change Arm 40 | Clutch Lever 64 and Clutch Arm 61 |
| --- | --- |
| Low-Speed Position L | Shiftable between Constant Drive Mode Position I and First Non-Drive Mode Position IIIa |
| Neutral Position N | First Non-Drive Mode Position IIIa or Second Non-Drive Mode Position IIIb |
| High-speed Position H | Second Non-Drive Mode Position IIIb |

Consequently, the relationship between the speed change mechanism and front-wheel drive assembly is represented as shown in the following TABLE 3.

TABLE 3

| Speed Change Mechanism (28) | Front-Wheel Drive Assembly 22 |
| --- | --- |
| Low-Speed Position L | Shiftable between Constant Drive Mode and Non-Drive Mode |
| Neutral Position N | Non-Drive Mode |
| High-Speed Position H | Non-Drive Mode |

As is the case of a tractor in which the first embodiment is employed, a tractor in which the second embodiment shown in FIGS. 13 and 14 is employed can be used for various works carried out in a condition in which the speed change mechanism in the rear-wheel drive assembly 20 is placed in its low-speed position, such that the non-drive mode is preferably selected for a light-load work to drive the tractor only by the two rear wheels and to thereby save fuel cost, and such that the constant drive mode is preferably selected for a heavy-load work to drive the tractor by four wheels and to thereby heighten the tractive force. When the tractor is moved over a road, the speed change mechanism is generally placed in its high-speed position so that the front-wheel drive assembly 22 is kept in its non-drive mode whereby the two-wheel drive of the vehicle is attained to save fuel cost. When the tractor is to be drawn by another vehicle, the speed change mechanism is shifted to its neutral position so that the front-wheel drive assembly 22 is placed in its non-drive mode. Consequently, as detailed before with respect to the first embodiment, no resistance against the traction is caused in the hydrostatic transmission. Needless to say, the relationship between the speed change mechanism and the front-wheel drive mechanism listed in TABLE 3 can be attained also by a connecting mechanism similar to the one shown in FIG. 12.

Figure 15:
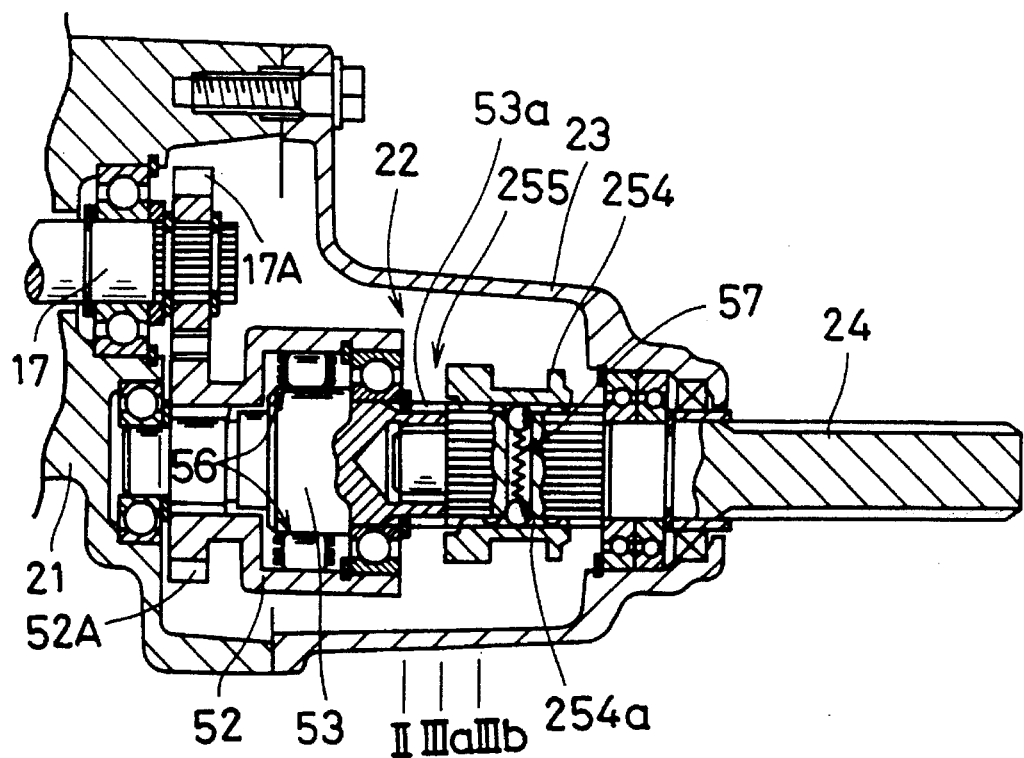
FIG. 15 is a sectional side view of a front-wheel drive assembly employed in a third embodiment.

FIGS. 15 and 16 show a third embodiment comprising a front-wheel drive assembly 22 which has a selective drive mode and a non-drive mode. In this embodiment, a rear-wheel drive assembly (not shown) which is the same as the one employed in the first embodiment is provided. As in the first embodiment, there are provided, as shown in FIG. 15, a hollow shaft 52, an intermediate shaft 53, and a one-way clutch 56 disposed between these shafts 52 and 53. In this third embodiment, however, a clutch 255 is provided which is operable only to connect and disconnect between the intermediate shaft 53 and the front-wheel drive shaft 24. That is, the clutch 255 comprises a movable clutch sleeve 254 which is slidably mounted on the front-wheel drive shaft 24 by a spline fitting. This clutch sleeve 254 has internal splines 254a which can be meshed with both of the external splines 53a of the intermediate shaft 53 and external splines of the drive shaft 24 so as to connect between the shafts 53 and 24. In correspondence with the three positions of the speed change mechanism in the rear-wheel drive assembly, the clutch sleeve 254 is adapted to be displaced to three positions II, IIIa and IIIb shown in FIG. 15, as viewed at the rear end position of sleeve 254, namely a selective drive mode position II, a first non-drive mode position IIIa and a second non-drive mode position IIIb. A detent mechanism 57 similar to the aforesaid one is disposed between the front-wheel drive shaft 24 and clutch sleeve 254.

The movable clutch sleeve 254 is operated to slide by an operating mechanism which is the same as the one employed in each of the first and second embodiments, and FIG. 16 illustrates such mechanism and its operation in a manner which is the same as that of FIG. 10 and as that of FIG. 15. FIGS. 16(a) to (e) correspond respectively to FIGS. 10(a) to (e) and to FIGS. 14(a) to (e). As can be understood now with ease, the relationship of positions corresponding to that listed in TABLE 2 is represented as shown in the following TABLE 4.

TABLE 4

| Change Lever 63 and Change Arm 40 | Clutch Lever 64 and Clutch Arm 61 |
| --- | --- |
| Low-Speed Position L | Shiftable between Selective Drive Mode Position II and First Non-Drive Mode Position IIIa |
| Neutral Position N | First Non-Drive Mode Position IIIa or Second Non-Drive Mode Position IIIb |
| High-Speed Position H | Second Non-Drive Position IIIb |

Consequently, the relationship between the speed change mechanism and front-wheel drive assembly is represented as shown in the following TABLE 5.

TABLE 5

| Speed Change Mechanism (28) | Front-Wheel Drive Assembly 22 |
| --- | --- |
| Low-Speed Position L | Shiftable between Selective Drive Mode and Non-Drive Mode |
| Neutral Position N | Non-Drive Mode |
| High-Speed Position H | Non-Drive Mode |

In general, the third embodiment shown in FIGS. 15 and 16 is suitable for use in a working vehicle which is used only for light-load works such as a mowing operation. Advantages provided by this embodiment when the selective drive mode is selected are the same as those described before with respect to the first embodiment. When the vehicle is travelled for a light-load working operation on a relatively stable ground where slippage of the rear wheels seldom occurs, the non-drive mode may satisfactorily be selected. Of course, the relationship listed in TABLE 5 can be attained also by a connecting mechanism similar to that shown in FIG. 12.

Figure 17:
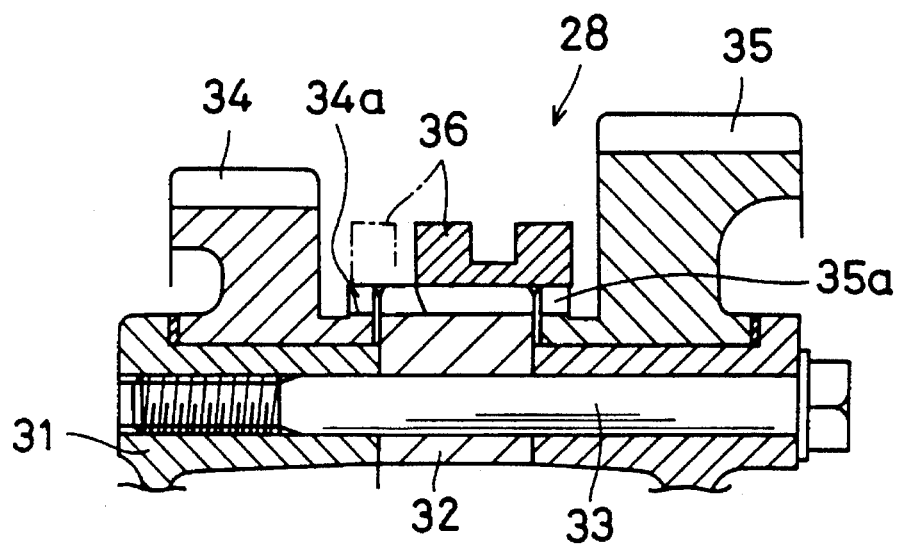
FIG. 17 is a sectional side view of a part of a speed change mechanism employed in a fourth embodiment.

In each of the embodiments having been detailed hereinbefore, the two-stage speed change mechanism in the rear-wheel drive assembly includes a neutral position. However, the four-wheel drive transmission according to the present invention can also be fashioned such that the two-stage change mechanism has only high-speed and low-speed positions and does not include a neutral position. FIGS. 17 and 18 show a fourth embodiment in which such speed change mechanism 28 is employed. As shown in FIG. 17 which illustrates a part of the change mechanism 28, the shifter collar 36 of this change mechanism is adapted to be shifted to two positions, namely a high-speed position shown in phantom, where the collar 36 engages with splines 34a of the high-speed gear 34 to thereby couple the gear 34 to the differential casing 31, and a low-speed position shown in solid lines where the collar 36 engages with splines 35a of the low-speed gear 35 to thereby couple the gear 35 to the casing 31.

In the fourth embodiment, a front-wheel drive assembly which is the same as the assembly 22 employed in the first embodiment is provided. The speed change mechanism 28 shown in FIG. 17 and the front-wheel drive assembly are operated respectively using the change lever 63 and clutch lever 64 shown in FIG. 18. As shown in this FIG. 18, a connecting mechanism substantially the same as the one employed in the first embodiment is disposed between the levers 63 and 64. In the fourth embodiment, the change lever 63 and change arm 40 are displaced to their high-speed positions H and to their low-speed positions L.

FIG. 18(a) shows a condition where the change lever 63 and change arm 40 are located in their low-speed positions L and the clutch lever 64 and clutch arm 61 are located in their selective drive mode position II. It is fashioned that the bent end 67a of connecting rod 67 is located in the condition shown in FIG. 18(a) at one of the ends of the elongated bore 61b which is closer to the change arm 40 than the other end. Accordingly, clutch lever 64 can be displaced to its constant drive mode position I, as shown in phantom, to thereby displace the clutch arm 61 to its constant drive mode position I as also shown in phantom.

When change lever 63 is operated from the condition shown in FIG. 18(a) towards its high-speed position H to thereby displace the change arm 40 towards its high-speed position H, the bent end 67a of rod 67 is displaced to the other end of elongated bore 61b, as shown in FIG. 18(b), when the change lever 63 and change arm 40 have been displaced to a mid point between their low-speed positions L and high-speed positions H. Consequently, when the change lever 63 is operated further, the clutch arm 61 and clutch lever 64 are displaced through the connecting rod 67 so that, at the high-speed positions H of change lever 63 and change arm 40, the clutch arm 61 and clutch lever 64 are located in their non-drive mode positions III as shown in FIG. 18(c).

In the condition shown in FIG. 18(c), the change lever 63 is kept in the lever-retaining recess of high-speed position H in the guide groove 68a so that the connecting rod 67 cannot be displaced towards the change arm 40 whereby the clutch lever 64 and clutch arm 61 cannot be displaced towards their selective drive mode positions II. This means that the front-wheel drive assembly is kept in its non-drive mode condition at the high-speed position of the speed change mechanism 28. When the change lever 63 is operated from this condition towards its low-speed position L, the connecting rod 67 becomes engaged at its bent end 67a with clutch arm 61 when the change lever 61 has been moved to a mid point between its high-speed position H and low-speed position L. Consequently, the clutch arm 61 and clutch lever 64 are placed in their selective drive mode positions II at the low-speed position L of the change lever 63.

Accordingly, the relationship between the speed change mechanism and front-wheel drive assembly can be summarized as shown in the following TABLE 6.

TABLE 6

| Speed Change Mechanism 28 | Front-Wheel Drive Assembly 22 |
| --- | --- |
| Low-Speed Position L | Shiftable between Constant Drive Mode and Selective Drive Mode |
| High-Speed Position H | Non-Drive Mode (necessarily) |

Although a vehicle in which the fourth embodiment is employed requires a fluid pressure-unloading valve for unloading fluid pressure in the hydrostatic transmission when the vehicle is to be drawn by another vehicle, this embodiment can be used in the other respects as advantageously as the first embodiment. Of course, a connecting mechanism similar to that shown in FIG. 12 may be employed in place of the mechanical mechanism such as shown in FIG. 18.

Each of the front-wheel drive assemblies 22 or their clutches 155 and 255 of two modes shown in FIG. 13 and in FIG. 15 can be combined similarly with a speed change mechanism which does not include a neutral position.

A mechanical connecting mechanism between the change arm 40 and clutch arm 61 may be fashioned such that it does not include any play like the play provided by the bent end 67a of the connecting rod 67 and the elongated bore 61b in the clutch arm 61. This can be attained by providing additional positions for the shifter means of the two-stage speed change mechanism 28 and for the clutch-shifting means in the front-wheel drive assembly 22, as will be detailed hereinafter.

Figure 19:
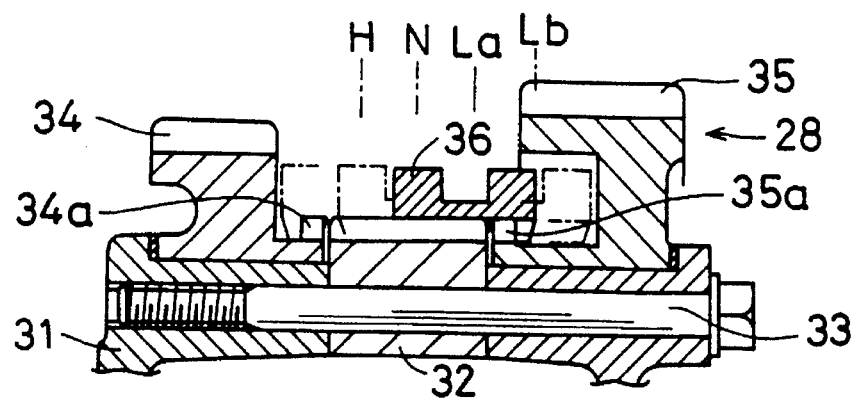
FIG. 19 is a sectional side view of a part of a speed change mechanism employed in a fifth embodiment.
Figure 20:
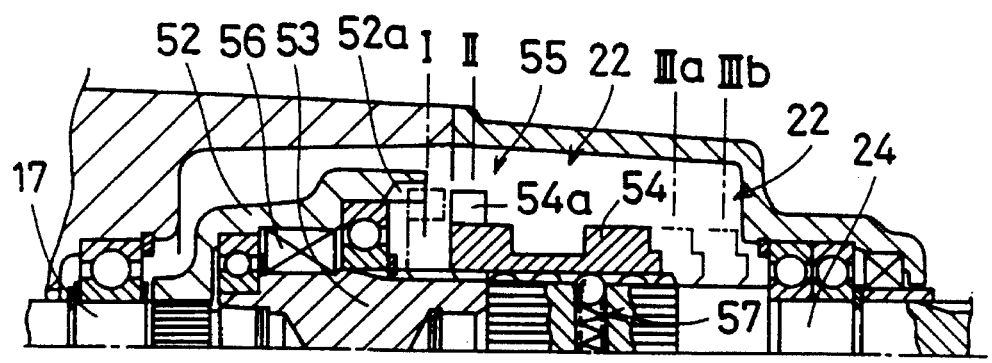
FIG. 20 is a sectional side view of a front-wheel drive assembly employed in the fifth embodiment.
Figure 21:
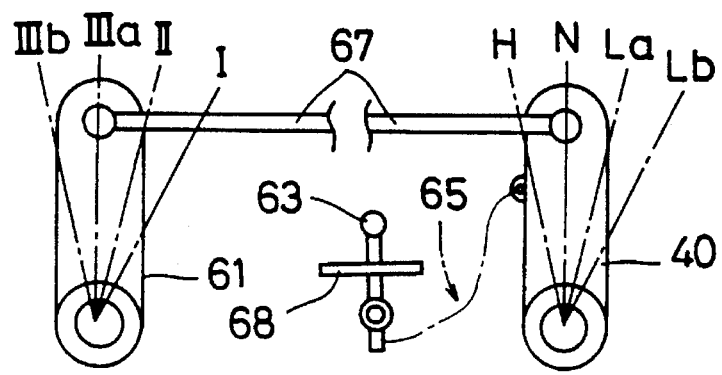
FIG. 21 is a schematic view showing a connecting mechanism between shifting and clutch-operating mechanisms employed in the fifth embodiment.

FIGS. 19 to 21 show a fifth embodiment which comprises a rear-wheel drive assembly including a speed change mechanism 28 shown in FIG. 19, a front-wheel drive assembly 22 shown in FIG. 20, and a connecting mechanism between the change arm 40 and clutch arm 61 shown in FIG. 21. As shown in FIG. 19, the shifter collar 36 of the speed change mechanism 28 is adapted to be operated at a high-speed position H where the high-speed gear 34 is coupled to the differential casing 31, a neutral position N where both of the high-speed and low-speed gears 34 and 35 are free, and first and second low-speed positions La and Lb where the low-speed gear 35 is coupled to the casing 31. The shifter collar 36 is retained releasably at each of these four positions H, N, La and Lb by a detent mechanism (not shown). The clutch 55 shown in FIG. 21 has a structure which is the same as that of the clutch 55 shown in FIG. 11, but the movable clutch sleeve 54 is adapted to be operated in a constant drive mode position I, a selective drive mode position II, a first non-drive mode position IIIa and a second non-drive mode position IIIb. The detent mechanism 57 is adapted to retain the sleeve 54 releasably at each of these four positions I, II, IIIa and IIIb.

As shown in FIG. 21, the change arm 40 and clutch arm 61 are connected to each other by a connecting rod 67 which is pivotally connected at its one and the other ends to these arms 40 and 61. The relationship between positions of the arms is predetermined such that, when the change arm 40 is placed in its second low-speed position Lb, first low-speed position La, neutral position N and high-speed position H, the clutch arm 61 is located in its constant drive mode position I, selective drive mode position II, first non-drive mode position IIIa and second non-drive mode position IIIb, respectively. In this fifth embodiment, no clutch lever is provided and a change lever 63 schematically shown in FIG. 21 is employed for displacing the clutch arm 61 together with the change arm 40. The change lever 63 is operatively connected to the change arm 40 through a connecting means 65 such as a push-pull cable. Although not shown in FIG. 21, a lever guide 68 for the change lever 63 is provided with a guide groove including lever-retaining recesses at each of the positions Lb, La, N and H in a fashion similar to that of the lever guide 68 shown in FIG. 9.

As can be understood from the foregoing descriptions, the relationship between the speed change mechanism 28 and front-wheel drive assembly 22 in the fifth embodiment shown in FIGS. 19 to 21 is represented as shown in the following TABLE 7.

TABLE 7

| Speed Change Mechanism 28 | Front-Wheel Drive Assembly 22 |
| --- | --- |
| Low-Speed Position L | Shiftable between Constant Drive Mode and Selective Drive Mode |
| Neutral Position N | Non-Drive Mode |
| High-Speed Position H | Non-Drive Mode |

Figure 22:
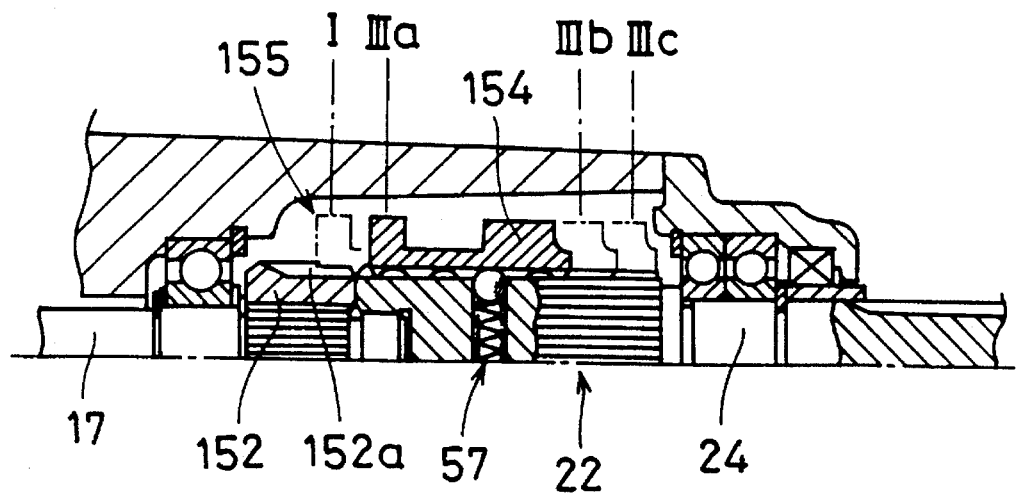
FIG. 22 is a sectional side view of a part of a front-wheel drive assembly employed in a sixth embodiment.
Figure 23:
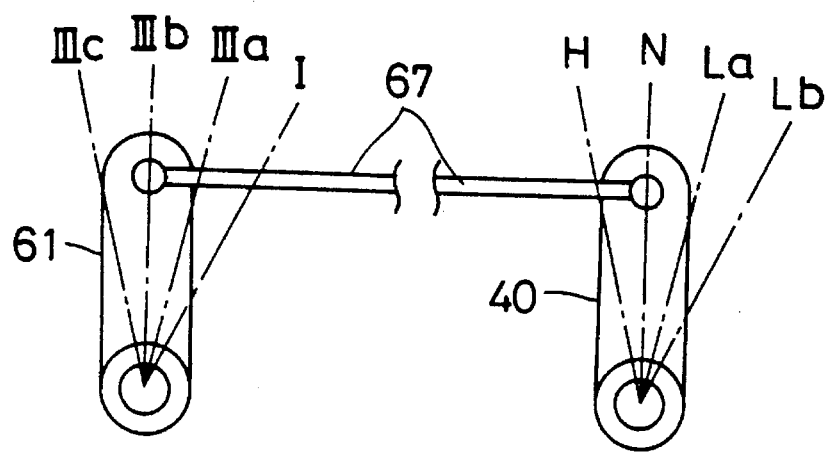
FIG. 23 is a schematic view similar to FIG. 21, but showing a connecting mechanism employed in the sixth embodiment.

FIGS. 22 and 23 show a sixth embodiment which provides the modes shown in TABLE 3. The speed change mechanism employed in this embodiment is entirely the same as the one employed in the fifth embodiment and shown in FIG. 19. Clutch 155 in the front-wheel drive assembly 22 is shown in FIG. 22 and has a structure which is the same as that of the clutch 155 shown in FIG. 13. In the sixth embodiment, however, the movable clutch sleeve 154 is adapted to be operated in a constant drive mode position I, a first non-drive mode position IIIa, a second non-drive mode position IIIb and a third non-drive mode position IIIc and is retained releasably at each of these four positions I, IIIa, IIIb and IIIc by a detent mechanism 57.

As shown in FIG. 23, the change arm 40 and clutch arm 61 are connected to each other by a connecting rod 67 which is pivotally connected at its one and the other ends to these arms 40 and 61. The relationship between positions of the arms is predetermined such that, when the change arm 40 is placed in its second low-speed position Lb, first low-speed position La, neutral position N and high-speed position H, the clutch arm 61 is located in its constant drive mode position I, first non-drive mode position IIIa, second non-drive mode position IIIb and third non-drive mode position IIIc, respectively. In this sixth embodiment, too, a single change lever (not shown) retainable at its respective positions is provided for operating the change mechanism and clutch 155 simultaneously. By displacing the change arm 40 between the positions La and Lb, the clutch arm 61 can be displaced between the positions IIIa and I so as to change the mode of the front-wheel drive assembly between the non-drive mode and constant drive mode.

Figure 24:
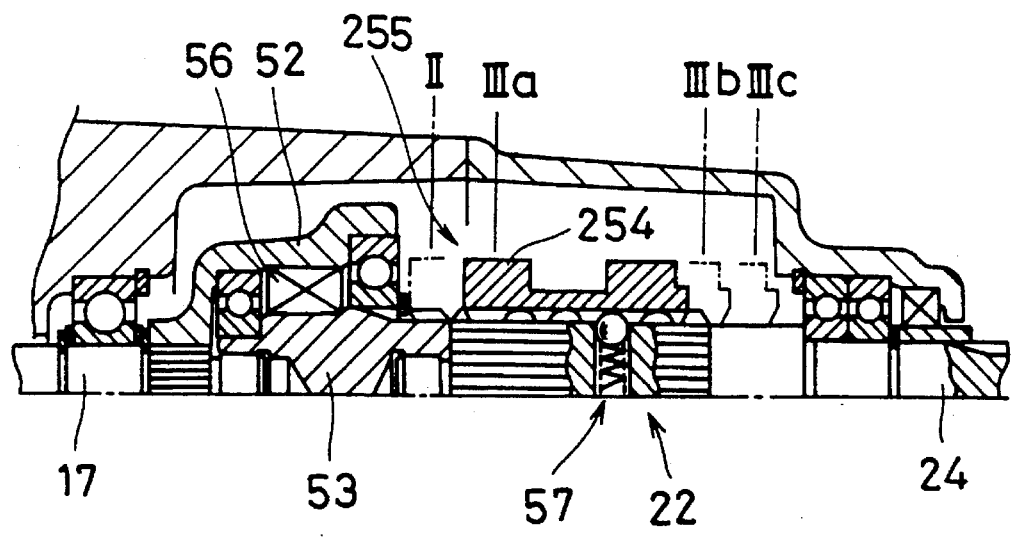
FIG. 24 is a sectional side view of a part of a front-wheel drive assembly employed in a seventh embodiment.
Figure 25:
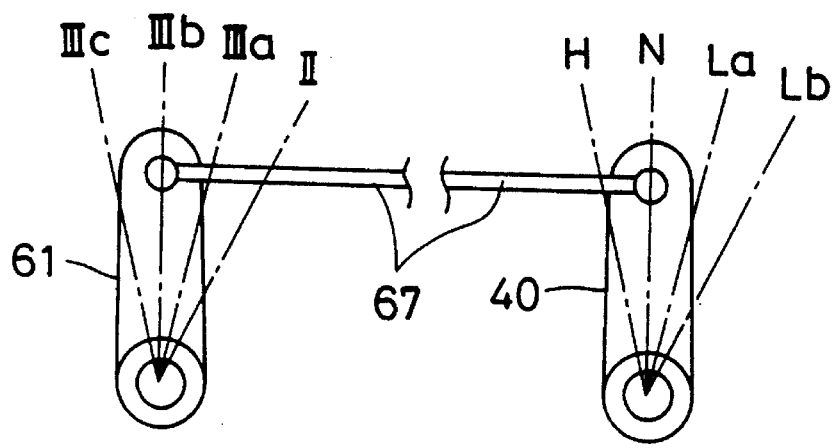
FIG. 25 is a schematic view similar to FIG. 21, but showing a connecting mechanism employed in the seventh embodiment.

FIGS. 24 and 25 show a seventh embodiment which provides the modes shown in TABLE 5. The speed change mechanism employed in this embodiment is entirely the same as the one employed in the fifth embodiment and shown in FIG. 19. The front-wheel drive assembly 22 shown in FIG. 24 is substantially the same as the assembly 22 shown in FIG. 5 except for the fact that the hollow shaft 52 is directly coupled to the output shaft 17 so that the intermediate shaft 53 and front-wheel drive shaft 24 are arranged co-axially with the output shaft 17. The drive assembly 22 thus includes a clutch 255 substantially the same as the one shown in FIG. 15. In the seventh embodiment, however, the movable clutch sleeve 254 of this clutch 255 is adapted to be operated in a selective drive mode position II, a first non-drive mode position IIIa, a second non-drive mode position IIIb and a third non-drive mode position IIIc and is retained releasably at each of these four positions I, IIIa, IIIb and IIIc by a detent mechanism 57. As shown in FIG. 25, the change arm 40 and clutch arm 61 are connected in a similar manner to the way they are connected in the fifth and sixth embodiments. The predetermined relationship between the positions of these arms 40 and 61 differs from that shown in FIG. 23, which illustrates the sixth embodiment, only in that the constant drive mode position I in FIG. 23 is replaced by the selective drive mode position II in FIG. 25. As can be understood now, the seventh embodiment provides modes listed in TABLE 5.

Figure 26:
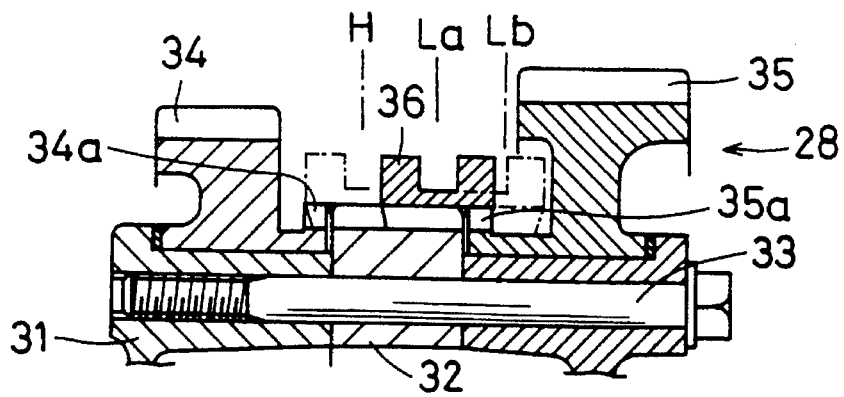
FIG. 26 is a sectional side view of a part of a speed change mechanism employed in an eighth embodiment.
Figure 27:
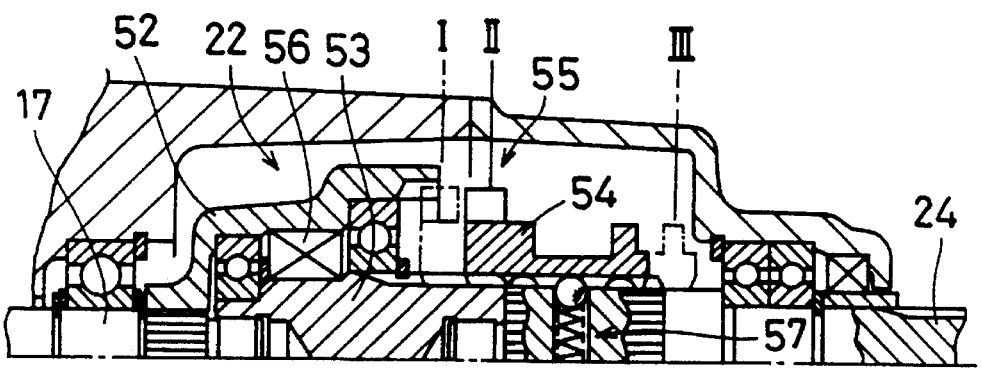
FIG. 27 is a sectional side view of a part of a front-wheel drive assembly employed in the eighth embodiment.
Figure 28:
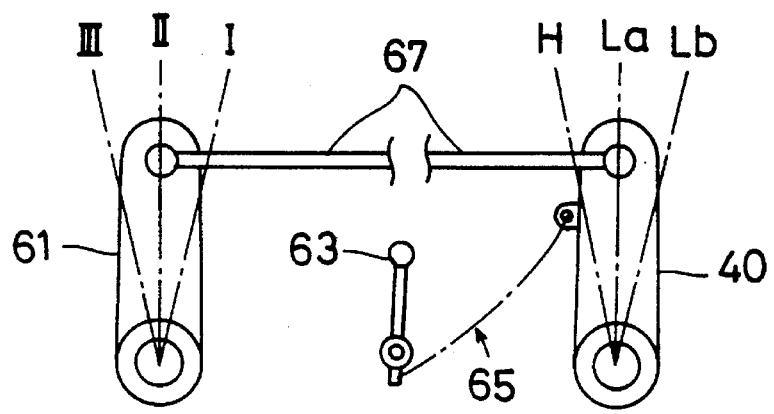
FIG. 28 is a schematic view showing a connecting mechanism between shifting and clutch-operating mechanisms employed in the eighth embodiment.

A similar connecting mechanism can be employed in a transmission in which the speed change mechanism 28 does not include a neutral position. FIGS. 26 to 28 show an eighth embodiment with regard to such transmission. As shown in FIG. 26, the speed change mechanism employed in this embodiment comprises a shifter collar 36 which is adapted to be operated in a high-speed position H where the high-speed gear 34 is coupled to the differential casing 31, and first and second low-speed positions La and Lb where the low-speed gear 35 is coupled to the casing 31. The collar 36 is retained releasably at each of these positions H, La and Lb by a detent mechanism (not shown). As shown in FIG. 27, clutch 55 in the front-wheel drive assembly 22 is the same as the clutch 55 shown in FIG. 11, and the movable clutch sleeve 54 of this clutch is adapted to be operated in a constant drive mode position I, a selective drive mode position II and a non-drive mode position III and is retained at each of these positions I, II and III by a detent mechanism 57.

As shown in FIG. 28, there are provided a change arm 40, which is operatively connected to a change lever 63 through a connecting means 65 such as a push-pull cable, and is operable to shift the shifter collar 36 shown in FIG. 26, and a clutch arm 61 which is operable to displace the clutch sleeve 54 shown in FIG. 27. And, the change arm 40 and the clutch arm 61 are connected to each other by a connecting rod 67 which is pivotally connected at its one and the other ends to arms 40 and 61. The relationship between positions of the arms is predetermined such that, when the change arm 40 is placed in its second low-speed position Lb, first low-speed position La and high-speed position H, the clutch arm 61 is located in its constant drive mode position I, selective drive mode position II and non-drive mode position III, respectively. The change lever 63 is adapted to be retained at each of its high-speed position, first low-speed position and second low-speed position. This eighth embodiment provides, as does the fourth embodiment, the modes listed in TABLE 6.

Figure 29:
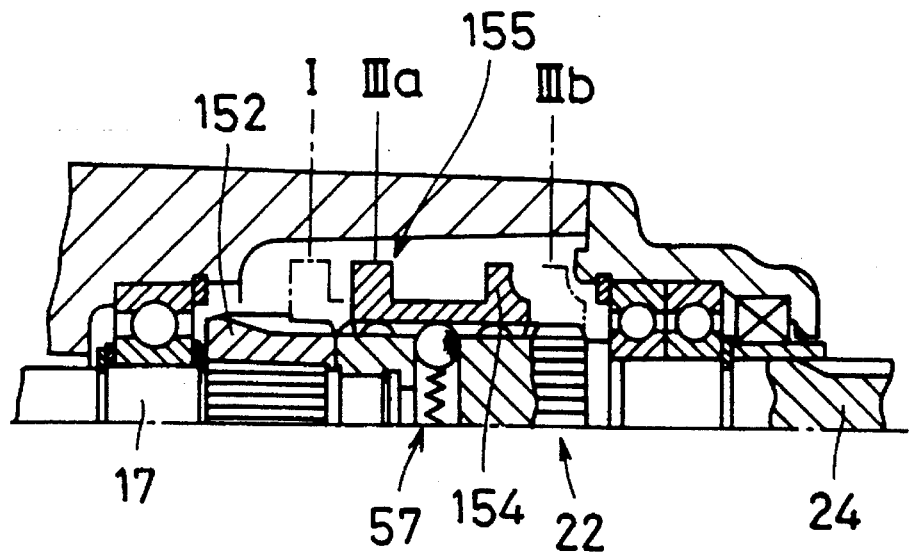
FIG. 29 is a sectional side view of a part of a front-wheel drive assembly employed in a ninth embodiment.
Figure 30:
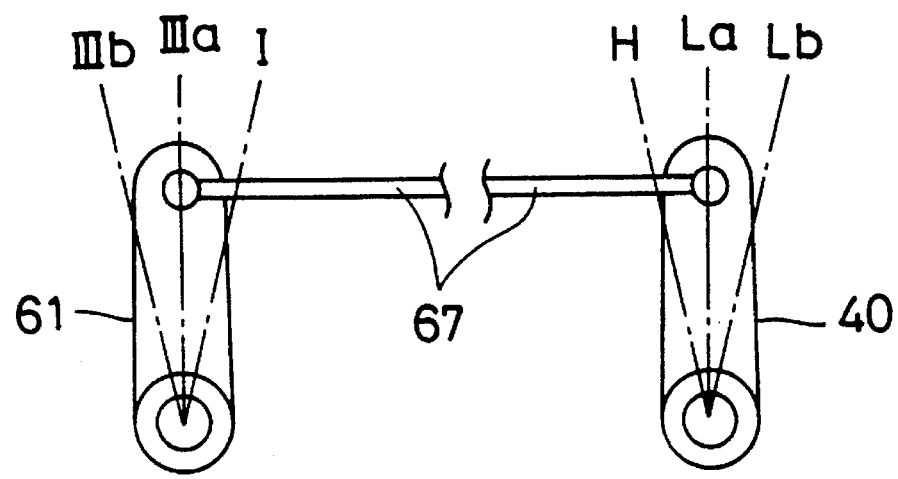
FIG. 30 is a schematic view similar to FIG. 28, but showing a connecting mechanism employed in the ninth embodiment.

FIGS. 29 and 30 show a ninth embodiment in which the speed change mechanism 28 which is the same as the one employed in the eighth embodiment and shown in FIG. 26 is employed here again. The front-wheel drive assembly 22 shown in FIG. 29 is the same as the one shown in FIG. 13, and the movable clutch sleeve 154 of this assembly 22 is adapted to be operated in a constant drive mode position I and first and second non-drive mode positions IIIa and IIIb and is retained releasably at each of these positions I, IIIa and IIIb by a detent mechanism 57. As shown in FIG. 30, a change arm 40 which is the same as the one employed in the eighth embodiment and a clutch arm 61 for operating the clutch sleeve 154 shown in FIG. 29 are connected to each other by a connecting rod 67 which is pivotally connected at its one and the other ends to these arms 40 and 61. The relationship between positions of the arms is predetermined such that, when the change arm 40 is placed in its second low-speed position Lb, first low-speed position La and high-speed position H, the clutch arm 61 is located in its constant drive mode position I, first non-drive mode position IIIa and second non-drive mode position IIIb, respectively.

Accordingly, the modes provided by the ninth embodiment shown in FIGS. 29 and 30 are represented as shown in the following TABLE 8.

TABLE 8

| Speed Change Mechanism (28) | Front-Wheel Drive Assembly 22 |
|---|---|
| Low-Speed Position L | Shiftable between Constant Drive Mode and Non-Drive Mode |
| High-speed Position H | Non-Drive Mode |

Figure 31:
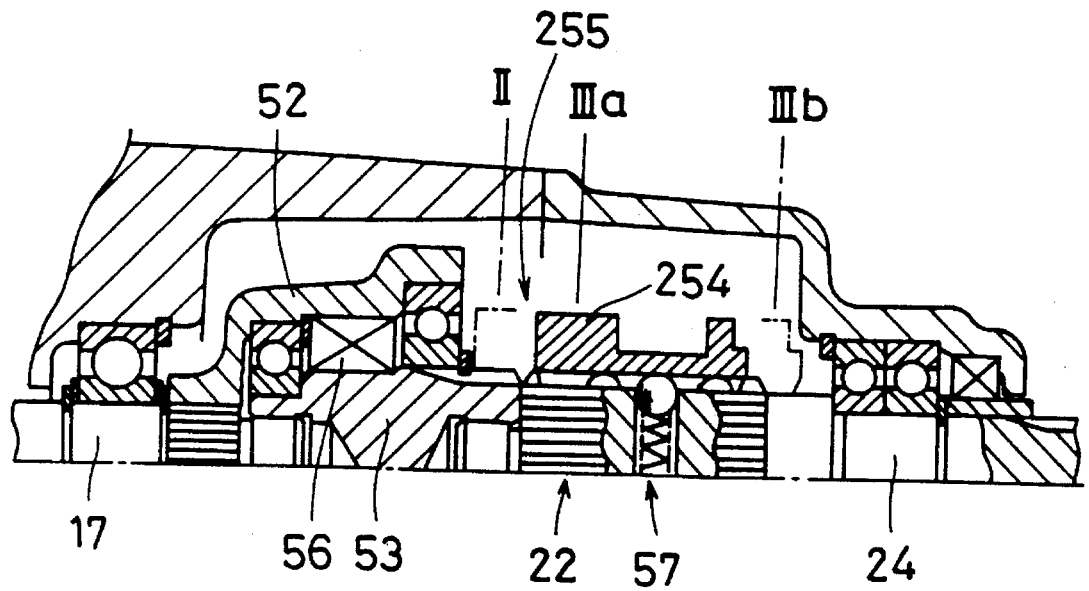
FIG. 31 is a sectional side view of a part of a front-wheel drive assembly employed in a tenth embodiment.
Figure 32:
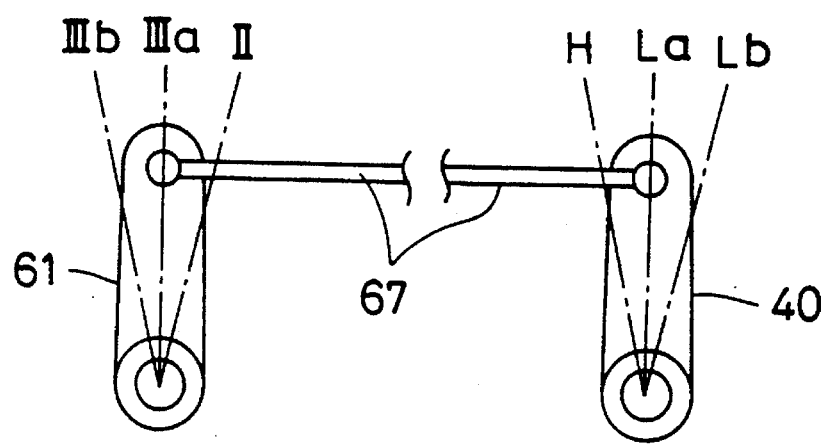
FIG. 32 is a schematic view similar to FIG. 28, but showing a connecting mechanism employed in the tenth embodiment.

FIGS. 31 and 32 show a tenth embodiment in which the speed change mechanism 28 which is the same as the one employed in the eighth embodiment and shown in FIG. 26 is employed here again. Clutch 255 in the front-wheel drive assembly 22 shown in FIG. 31 is the same as the one shown in FIG. 24, but the movable clutch sleeve 254 of this clutch 255 is adapted to be operated in a selective drive mode position II and first and second non-drive mode positions IIIa and IIIb and is retained releasably at each of these positions II, IIIa and IIIb by a detent mechanism 57. As shown in FIG. 32, change arm 40 and clutch arm 61 are connected to each other by a connecting rod 67 such that, when the change arm 40 is placed in its second low-speed position Lb, first low-speed position La and high-speed position H, the clutch arm 61 is located in its selective drive mode position II, first non-drive mode position IIIa and second non-drive mode position IIIb, respectively.

Accordingly, the modes provided by the tenth embodiment shown in FIGS. 31 and 32 are represented as shown in the following TABLE 9.

TABLE 9

| Speed Change Mechanism (28) | Front-Wheel Drive Assembly 22 |
|---|---|
| Low-Speed Position L | Shiftable between Selective Drive Mode and Non-Drive Mode |
| High-Speed Position H | Non-Drive Mode |

Each of the fifth to tenth embodiments is advantageous in that a single lever or another single operating member is satisfactory for operating the speed change mechanism 28 and clutch 55, 155 or 255.

While preferred embodiments of the invention have been described, it will be appreciated that various modifications and changes may be made without departing from the spirit and scope of the appended claims.

We claim:

1. A four-wheel drive transmission for a working vehicle, comprising:

a hydrostatic transmission (13) which includes an output shaft (17) extending axially of the vehicle;

a rear-wheel drive assembly (20) which is disposed at a location behind said output shaft (17) and is adapted to receive power from a rear end of said output shaft and to drive left and right rear wheels (2), said rear-wheel drive assembly including a two-stage speed change mechanism (28) having a high-speed position and a low-speed position;

a front-wheel drive assembly (22) which is disposed at a location before said output shaft (17) and includes a front-wheel drive shaft (24) extending axially of the vehicle for taking-off power for driving left and right front wheels (1), an intermediate shaft (53) disposed between said output shaft and said front-wheel drive shaft, a one-way clutch (58) disposed between said output shaft and said intermediate shaft such that when said one-way clutch is driven to rotate forward-directionally from the side of said output shaft said one-way clutch is engaged automatically so as to connect said intermediate shaft to said output shaft, and a clutch (55; 155; 255) for selectively connecting said front-wheel drive shaft to said intermediate shaft;

shift means (40, 63) for shifting the position of said speed change mechanism (28);

clutch-operating means (61; 90) for shifting the condition of said clutch (55; 155; 255); and connecting means (67; 92) for connecting said clutch-operating means (61; 90) to said shift means (40, 63) such that when said speed change mechanism (28) is shifted to said high-speed position said clutch (55; 155; 255) is shifted to a disengaged condition so as to disconnect said front-wheel drive shaft (24) from said intermediate shaft (53).

2. The four-wheel drive transmission as set forth in claim 1, wherein said speed change mechanism (28) further has a neutral position for interrupting transmission of power to the rear wheels (2), said connecting means (67; 92) being adapted to connect said clutch-operating means (61; 90) to said shift means (40, 63) such that when said speed change mechanism (28) is shifted to said neutral position said clutch (55; 155; 255) is shifted to said disengaged condition.

3. The four-wheel drive assembly as set forth in claim 1, wherein said clutch (55; 155; 255) for selectively connecting said front wheel drive shaft to said intermediate shaft is further operable to connect said front-wheel drive shaft (24) directly to said output shaft (17) by being operated by said clutch-operating means (61; 90).

4. The four-wheel drive transmission as set forth in claim 1, wherein said front-wheel drive assembly (22) is housed in a housing (23) which is connected integral with a housing (21) for said hydrostatic transmission (13).

5. A four-wheel drive transmission for a working vehicle, comprising:

a hydrostatic transmission (13) which includes an output shaft (17) extending axially of the vehicle;

a rear-wheel drive assembly (20) which is disposed at a location behind said output shaft (17) and is adapted to receive power from a rear end of said output shaft and to drive left and right rear wheels (2), said rear-wheel drive assembly including a two-stage speed change mechanism (28) having a high-speed position and a low-speed position and shift means (40, 63) for shifting the position of said speed change mechanism;

a front-wheel drive assembly (22) which includes a front-wheel drive shaft (24) extending axially of the vehicle for taking-off power for driving left and right front wheels (1) and a clutch mechanism comprising a clutch (55) for selectively connecting said front-wheel drive shaft to said output shaft, said clutch mechanism including a one-way clutch (56) for automatically connecting between said output shaft (17) and said front-wheel drive shaft (24) when the forward-directional rotation speed of said output shaft is substantially larger than the forward-directional rotation speed of said front-wheel drive shaft, said front-wheel drive assembly further including clutch-operating means (61; 90) and being shiftable by said clutch-operating means selectively to a constant drive mode in which said front-wheel drive shaft is driven constantly by said output shaft through said clutch, a selective drive mode in which said front-wheel drive shaft is driven by said output shaft selectively through said one-way clutch at an engaged condition thereof, and a non-drive mode in which said front-wheel drive shaft is disconnected constantly from said output shaft; and connecting means (67; 92) for connecting said clutch-operating means (61; 90) to said shift means (40, 63) such that when said speed change mechanism (28) is shifted to said high-speed position said front-wheel drive assembly (22) is shifted to said non-drive mode, said connecting means permitting said clutch-operating means to shift said front-wheel drive assembly between said constant drive mode and said selective drive mode.

6. The four-wheel drive transmission as set forth in claim 5, wherein said speed change mechanism (28) further has a neutral position for interrupting transmission of power to the rear wheels (2), said connecting means (67; 92) being adapted to connect said clutch-operating means (61; 90) to said shifting means (40, 63) such that when said speed change mechanism (28) is shifted to said neutral position said front-wheel drive assembly (22) is shifted to any one of said non-drive mode and said selective drive mode.

7. The four-wheel drive assembly as set forth in claim 5, wherein said front-wheel drive assembly (22) further includes a freely rotatable intermediate shaft (53) disposed between said output shaft (17) and said front-wheel drive shaft (24), said one-way clutch (58) being disposed between said output shaft and said intermediate shaft, said clutch (55) being operable to shift said front-wheel drive assembly (22) to said constant drive mode by connecting between said output shaft and said font-wheel drive shaft, to said selective drive mode by connecting between said intermediate shaft and said front-wheel drive shaft, and to said non-drive mode by disconnecting said front-wheel drive shaft from both of said output shaft arid said intermediate shaft.

8. The four-wheel drive transmission as set forth in claim 5, wherein said front-wheel drive assembly further includes a rotatable shaft (52) which is driven to rotate by said output shaft (17) at a slightly reduced speed of rotation, said one-way clutch (56) being disposed such that said one-way clutch connects between said rotatable shalt and said front-wheel drive shaft (24) when the forward directional rotation speed of said rotatable shaft is larger than that of said front-wheel drive shaft.

9. A four-wheel drive transmission for a working vehicle, comprising:

a hydrostatic transmission (13) which includes a displacement-variable hydraulic pump (14) having an input shaft (16) extending axially of the vehicle, and a displacement-fixed hydraulic motor (15) having an output shaft (17) extending axially of the vehicle;

a rear-wheel drive assembly (20) which is disposed at a location behind said output shaft (17) and is adapted to receive power from a rear end of said output shaft and to drive left and right rear wheels (2), said rear-wheel drive assembly including a differential gearing (27), a two-stage speed change mechanism (28) having a high-speed position and a low-speed position, and a rockable change arm (40) for shifting the position of said speed change mechanism, said hydrostatic transmission (13) being integrated with said rear-wheel drive assembly (20);

a front-wheel drive assembly (22) which is mounted on a front of said rear-wheel drive assembly (20) at a location before said output shaft (17) such that said front-wheel drive assembly is substantially integral with said rear-wheel drive assembly, said front-wheel drive assembly including a front-wheel drive shaft (24) extending axially of the vehicle for taking-off power for driving left and right front wheels (1), a clutch mechanism comprising a clutch (155; 255) for selectively connecting said front-wheel drive shaft to a front end of said output shaft, and a rockable clutch arm (61), said front-wheel drive assembly being shiftable by said clutch arm selectively to a drive mode, in which said front-wheel drive shaft is driven by said output shaft, and to a non-drive mode in which said front-wheel drive shaft is disconnected from said output shaft; and connecting rod means (67) for mechanically connecting said clutch arm (61) to said change arm (40) such that when said speed change mechanism (28) is shifted to said high-speed position said front-wheel drive assembly (22) is automatically shifted to said non-drive mode, said connecting rod means including a lost motion connection (61b, 67a) for permitting said clutch arm to shift said front-wheel drive assembly between said drive mode and said non-drive mode at said low-speed position of said speed change mechanism.

10. The four-wheel drive transmission as set forth in claim 9, wherein said drive mode is a constant drive mode in which said front-wheel drive shaft (24) is connected to said output shaft (17) through said clutch (155) so as to be driven constantly by said output shaft.

11. The four-wheel drive transmission as set forth in claim 10, wherein said speed change mechanism (28) further has a neutral position for interrupting transmission of power to the rear wheels (2), said connecting rod means (67) being adapted to connect said clutch arm (61) to said change arm (40) such that when said speed change mechanism (28) is shifted to said neutral position said front-wheel drive assembly (22) is shifted to said non-drive mode.

12. The four-wheel drive transmission as set forth in claim 9, wherein said clutch mechanism further includes a one-way clutch (56) which is engaged when the forward directional rotation speed of said output shaft (17) is substantially larger than that of said front-wheel drive shaft (24), said drive mode being a selective drive mode in which said front-wheel drive shaft is driven selectively when said one-way clutch is engaged.

13. The four-wheel drive transmission as set forth in claim 12, wherein said speed change mechanism (28) further has a neutral position for interrupting transmission of power to the rear wheels (2).

14. The four-wheel drive transmission as set forth in claim 12, wherein said front-wheel drive assembly further includes a rotatable shaft (52) which is driven to rotate by said output shaft (17) at a slightly reduced speed of rotation, said one-way clutch (56) being disposed such that said one-way clutch is engaged so as to connect between said rotatable shaft and said front-wheel drive shaft (24) when the forward directional rotation speed of said rotatable shaft is larger than that of said front-wheel drive shaft.

15. The four-wheel drive assembly as set forth in claim 12, wherein said front-wheel drive assembly (22) further includes a freely rotatable intermediate shaft (53) disposed between said output shaft (17) and said front-wheel drive shaft (24), said one-way clutch (56) being disposed between said output shaft and said intermediate shaft, said clutch (255) being operable to shift said front-wheel drive assembly (22) to said drive mode by connecting between said intermediate shaft and said front-wheel drive shaft and to said non-drive mode by disconnecting between said intermediate shaft and said front-wheel drive shaft.

* * * * *